(12) United States Patent
Cafarella et al.

(10) Patent No.: US 10,339,141 B2
(45) Date of Patent: Jul. 2, 2019

(54) DETECTING AT LEAST ONE PREDETERMINED PATTERN IN STREAM OF SYMBOLS

(71) Applicant: THE REGENTS OF THE UNIVERSITY OF MICHIGAN, Ann Arbor, MI (US)

(72) Inventors: Michael Cafarella, Ann Arbor, MI (US); Vaibhav Gogte, Ann Arbor, MI (US); Thomas Wenisch, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 401 days.

(21) Appl. No.: 15/160,247

(22) Filed: May 20, 2016

(65) Prior Publication Data

US 2016/0267142 A1    Sep. 15, 2016

Related U.S. Application Data

(63) Continuation-in-part of application No. 14/862,350, filed on Sep. 23, 2015, which is a continuation-in-part
(Continued)

(30) Foreign Application Priority Data

Feb. 10, 2016   (IN) ............................. 201611004698

(51) Int. Cl.
*G06F 17/30* (2006.01)
*G06F 16/2455* (2019.01)
*G06F 16/903* (2019.01)

(52) U.S. Cl.
CPC .. *G06F 16/24568* (2019.01); *G06F 16/90344* (2019.01)

(58) Field of Classification Search
CPC ......... G06F 16/24534; G06F 16/24568; G06F 16/90344; G06F 9/30018
(Continued)

(56) References Cited

U.S. PATENT DOCUMENTS 6,751,772 B1 *   6/2004   Kim ................... H03M 13/2957
                                                              714/755
7,539,681 B2    5/2009   Norton
(Continued)

OTHER PUBLICATIONS

U.S. Appl. No. 14/862,350, filed Sep. 23, 2015; Inventor: Tandon et al.
(Continued)

*Primary Examiner* — Hung T Vy
(74) *Attorney, Agent, or Firm* — Nixon & Vanderhye P.C.

(57) ABSTRACT

An apparatus comprises pattern matching circuitry for detecting instances of at least one predetermined pattern of symbols within a subject stream of symbols. Encoding circuitry is provided for generating an encoded stream of symbols from an input stream of symbols, where the encoding circuitry maps a number of consecutive repetitions of a same pattern of one or more symbols detected within the input stream to a single instance of a symbol of the encoded stream and a corresponding repetition indicator indicative of the number of consecutive repetitions. Control circuitry controls the pattern matching circuitry to process the encoded stream of symbols generated by the encoding circuitry as the subject stream.

15 Claims, 22 Drawing Sheets

Related U.S. Application Data of application No. 14/494,047, filed on Oct. 3, 2014, now abandoned.

(58) Field of Classification Search
USPC .......................................................... 707/759
See application file for complete search history.

(56) References Cited

U.S. PATENT DOCUMENTS

| | | | |
|---|---|---|---|
| 2008/0033974 A1* | 2/2008 | Cameron | G06F 17/272 |
| 2008/0049865 A1* | 2/2008 | Blankenship | H03M 13/23 |
| | | | 375/295 |
| 2012/0262314 A1* | 10/2012 | Carlson | H03M 7/425 |
| | | | 341/87 |
| 2016/0012107 A1 | 1/2016 | Asaad | |

OTHER PUBLICATIONS

U.S. Appl. No. 14/494,047, filed Oct. 3, 2014; Inventor: Tandon et al.
A.V. Aho and M.J. Corasick, "Efficient string matching: An aid to bibliographic search," Communications of the ACM, vol. 18, No. 6, Jun. 1975, pp. 333-340, 1975.
R.S. Boyer and J.S. Moore, "A fast string searching algorithm," Communications of the ACM, vol. 20, No. 10, pp. 762-772, Oct. 1977.
S. Wu and U. Manber,"A fast algorithm for multi-pattern searching," Technical report TR-94-17, Department of Computer Science, University of Arizona, May 1994 11 pages.
Y. H. Cho and W. H. Mangione-Smith, "A pattern matching coprocessor for network security," in Proc. DAC '05, pp. 234-239, ACM, Jun. 13-17, 2005.
L. Tan and T. Sherwood, "A high throughput string matching architecture for intrusion detection and prevention," in Proc. ISCA '05, pp. 112-122, IEEE, Jun. 4-8, 2005.
B. Commentz-Walter, "A string matching algorithm fast on the average," Proc. of the 6th Colloquium, on Automata, Languages and Programming, pp. 118-132, Jul. 1979.
R.Sidhu and V.K.Prasanna, "Fast regular expression matching using FPGAs," Proc. IEEE FCCM, pp. 227-238, Apr. 2001.
M. Becchi and P. Crowley, "Efficient regular expression evaluation—theory to practice," in Proc. Architectures for Networking and Communications Systems, ANCS, Nov. 6-7, 2008, pp. 50-59.
D. Luchaup, R. Smith, C. Estan, and S. Jha, "Multi-Byte Regular Expression Matching with Speculation" RAID 2009, LNCS 5758, pp. 1-20, Sep. 2009.
D. Pao, W. Lin and B. Liu, "A memory-efficient pipelined implementation of the Aho-Corasick string—matching algorithm" ACM Trans. on Archit. Code Optim., vol. 7, pp. 1-27, Sep. 2010.
W. Lin and B. Liu, "Pipelined parallel AC-based approach for multi-string matching" IEEE ICPADS, pp. 665-672, Dec. 2008.
Y. Sugawara, M. Inaba and K. Hiraki, "Over 10Gbps string matching mechanism for multi-stream packet scanning systems" Field Programmable Logic and Application, vol. 3203, pp. 484-493, Aug. 30-Sep. 1, 2004.
G. Tripp, "A parallel 'string matching engine' for use in high speed network intrusion detection systems" Journal in Computer Virology, vol. 2, pp. 21-34, Jun. 2006.
H. Lu, K. Zheng, B. Liu, X. Zhang, Y. Liu, "A Memory-Efficient Parallel String Matching Architecture for High-Speed Intrusion Detection" IEEE Journal on Selected Areas in Communication, vol. 24, No. 10, Oct. 2006, p. 1793-1804.
Jan van Lunteren, Christoph Hagleitner, Kubilay Atasu, Giora Biran, Uzi Shvadron, and Timothy Heil, "Designing a Programmable Wire-Speed Regular-Expression Matching Accelerator" 2012 IEEE/ACM 45th Annual International Symposium on Microarchitecture, Dec. 2012, pp. 461-472.

A. Bremler-Barr, D. Hay and Y. Koral, "CompactDFA: Generic State Machine Compression for Scalable Pattern Matching", IEEE INFOCOM, Mar. 14-19, 2010, 9 pages.
P. Piyachon and Y. Luo, "Compact State Machines for High Performance Pattern Matching", DAC 2007, Jun. 4-8, 2007, pp. 493-496.
S. Borkar and A.A Chien, "The Future of Microprocessors", Communications of the ACM, vol. 54, No. 5, May 2011, pp. 67-77.
H. Esmaeilzadeh, E. Blem, R. St Amant, K Sankaralingam and D Burger, "Dark Silicon and the End of Multicore Scaling" in Computer Architecture, ISCA '11, Jun. 4-8, 2011, pp. 365-376.
J. Leverich and C. Kyzyrakis, "On the Energy (in)efficiency of Hadoop Clusters" SIGOPS Operating Systems Review printed on Sep. 23, 2014, pp. 61-65.
A. Pavlo, E. Paulson, A. Rasin, D. J Abadi, D. J DeWitt, S Madden and M Stonebraker, "A comparison of approaches to large scale data analysis", SIGMOD '09, Jun. 29-Jul. 2, 2009, pp. 165-178.
A. Raghavan, Y Luo, A Chandawalla, M Papaefthymiou, K. P Pipe, T Wenisch and M Martin, "Computation Sprinting" Proceedings of the 18th Symposium on High Performance Computer Architecture (HPCA 2012), Feb. 2012, 12 pages.
Synopsys DesignWare Building blocks, DesignWare Developers Guide, (Sep. 2011), 94 pages.
M. Taylor, "Is dark silicon useful?" DAC 2012, (Jun. 3-7, 2012), 6 pages.
M. Busch et al, "Earlybird: Real-Time Search at Twitter" Proceedings of the 2012 28th International Conference on Data Engineering ICDE '12, Apr. 1, 2012, 10 pages.
Doshi, "Using File Contents as Input for Search, Blogs: Tips & Tricks" http://blogs.splunk.com/2009/08/28/using-file-contents-as-input-for-search/ Aug. 28, 2009, 3 pages.
N. Hua et al, "Variable-Stride Multi-Pattern Matching for Scalable Deep Packet Inspection" IEEE INFOCOM 2009, Apr. 19-25, 2009, pp. 415-423.
IBM Corp., IBM PureData System for Analytics Architecture: A Platform for High Performance Data Warehousing and Analytics, 2010, pp. 1-16.
O. Kocberber et al, "Meet the Walkers, Accelerating Index Traversals for In-Memory Databases" MICRO-46 Dec. 7-11, 2013, pp. 468-479.
A. Lamb et al, "The Vertica Analytic Database: C-Store 7 Years Later" Proceedings of the VLDB Endowment, vol. 5, No. 12, Aug. 27-31, 2012, pp. 1790-1801.
S. Manegold, "Database Architecture Evolution: Mammals Flourished long before Dinosaurs became Extinct" VLDB '09, Aug. 24-29, 2009, 6 pages.
S. Melnik et al, "Dremel: Interactive Analysis of Web-Scale Datasets" Proceedings of the VLDB Endowment, vol. 3, No. 1, Sep. 13-17, 2010, 10 pages.
R. Mueller, "Data Processing on FPGAs" VLDB '09, Aug. 24-28, 2009, 12 pages.
L. Neumeyer, "S4: Distributed Stream Computing Platform" IEEE International Conference on Data Mining Workshops (ICDMW), Dec. 13, 2010, 8 pages.
R.L. Villars et al, "Big Data: What It Is and Why You Should Care" IDC, White Paper, Jun. 2011, pp. 1-14.
V. Sikka et al, "SAP HANA: The Evolution from a Modern Main-Memory Data Platform to an Enterprise Application Platform" Proceedings of the VLDB Endowment, vol. 6, No. 11, Aug. 26-30, 2013, 2 pages.
M. Stonebraker et al, "The 8 Requirements of Real-Time Stream Processing" ACM SIGMOD, vol. 34, Issue 4, Dec. 2005, 6 pages.
VOLTDB, Technical Overview, High Performance, Scalable RDBMS for Big Data and Real-Time Analytics, 4 pages.
J. Teubner et al, "Skeleton Automata for FPGAs: Reconfiguring without Reconstructing" SIGMOD'12, May 20-24, 2012, 12 pages.
L. Wu et al, "Q100: The Architecture and Design of a Database Processing Unit" ASPLOS'14, Mar. 1-5, 2014, 14 pages.
M. Zaharia et al, "Resilient Distributed Datasets: A Fault-Tolerant Abstraction for In-Memory Cluster Computing" NSDI'12 Proceedings of the 9th USENIX Conference on Networked Systems Design and Implementation, Apr. 25, 2012, 14 pages.

(56) References Cited

OTHER PUBLICATIONS

X. Zha et al, "GPU-to-GPU and Host-to-Host Multipattern String Matching on a GPU" IEEE Transactions on Computers, vol. 62, No. 6, Jun. 2013, pp. 1156-1169.
C. Chen et al, "An Efficient Multicharacter Transition String-Matching Engine Based on the Aho-Corasick Algorithm" ACM Transactions on Architecture and Code Optimization, vol. 10, No. 4, Article 25, Dec. 2013, pp. 1-22.
D. Bryant, "Disrupting the Data Center to Create the Digital Services Economy" https://communities.intel.com/community/itpeernetwork/datastack/blog/2014/06/18/disrupting-the-data-center-to-create-the-digital-services-economy Jun. 2014, 2 pages.
E. Hatcher et al, "Lucene in Action" 2005, 457 pages.
L. Woods et al, "Complex Event Detection at Wire Speed with FPGAs" Proceedings of the VLDB Endowment, vol. 3, No. 1, Sep. 13-17, 2010, pp. 660-669.
M. Stonebraker et al, "The VoltDB Main Memory DBMS" Bulletin of the IEEE Computer Society Technical Committee on Data Engineering, Jun. 2013, pp. 21-27.
Office Action dated Aug. 10, 2018 in co-pending U.S. Appl. No. 14/862,350, 19 pages.

\* cited by examiner

| Instruction | Description |
|---|---|
| *matchString* | Process input stream one character at a time, and attempt to match against a pattern matching state machine. Supports exact matches and regular expressions |
| *matchNumber* | Process input stream one character at a time, and convert the charcters seen into a number; equivalent to a hardware version of ATOI |
| *checkNumber* | Check if number seen by *matchNumber* is greater than, less than, or equal to specified value |
| *math* | Perform mathematical operations such as addition, subtraction, division, multiplication, and XOR |
| *writeToResultQueue* | Write out the specified registers to the result queue |

FIG. 3 www.pbs.org/nature.html; 72; 06:32:09; opera; linux; 131.24.0.7; 13,789,432; 3125
www.pbs.org/frontline.html; 41; 07:14:15; safari; osx; 187.98.32.1; 762,989,123; 7412
www.pbs.org/peg+cat.html; 156; 08:47:45; firefox; osx; 243.56.171.53; 432,404; 6780
www.pbs.org/dinosaur_train.html; 23; 11:11:11; ie; windows; 54.12.87.10; 55,764; 904
www.pbs.org/nova.html; 32; 16:56:21; safari; osx; 212.63.75,31; 314,573; 510

| Algorithm 1 | The multicharacter bit-split pattern matching automata compilation algorithm |
|---|---|

Input: Query K and architecture width W
Output: Bit split automata set M

```
 1: S = shared (sort(∪ predicates(K)))
 2: S' = []
 3: for each s ∈ S do
 4:    for i = 1 to W do
 5:        S'.append(pad(s, i, W))
 6:    end for
 7: end for
 8:
 9: Automata set M = {}
10: for each s ∈ S' do
11:    for i = 0 to len(s) do
12:        for bit b ∈ s[i] do
13:            M[i MOD W].addNode(b)
14:        end for
15:    end for
16: end for
17:
18: for each m ∈ M do
19:    makeDFA(m)
20:    for each q ∈ M.states do
21:        makePMV(q)
22:    end for
23: end for
```

FIG. 9

(a) Single-Unit (b) Multi-Unit, 32GC/s

Step 1: List of regular expressions to be searched

Pattern 1: a a b [a+] d e f g
Pattern 2: f g

Step 2: Search terms split on Kleene Plus resulting in three components. The second patterns remains unchanged Component 1: a a b
Component 2: a
Component 3: d e [f g]
Component 4: [f g]

Step 3: Since component 4 form a suffix of component 3, it is further split to create components *de* and *fg*

Component 1: [a a] b
Component 2: [a]
Component 3: d e
Component 4: f g

Step 4: In Step 3, component 2 repeats at consecutive positions in component 1, hence the recurring instances are merged create a component *ab*

Component 1: a b
Component 2: a
Component 3: d e
Component 4: f g

FIG. 17

List of components |S|

Parallel sets of components with and without character classes are created. The length of components is retained by replacing voids with dot characters Each set of components is padded to obtain |S|xW components to account to an alignment across W-character window Each bit of the padded components is mapped to the corresponding bit-split machine

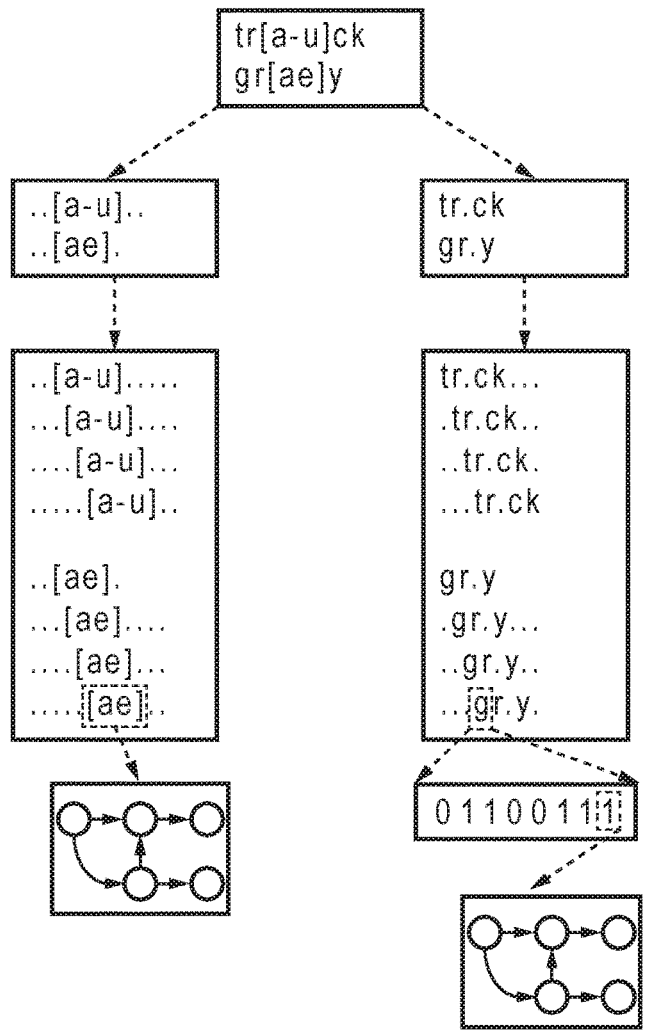

FIG. 18

DETECTING AT LEAST ONE PREDETERMINED PATTERN IN STREAM OF SYMBOLS

This application is a continuation-in-part of U.S. patent application Ser. No. 14/862,350 filed on Sep., 23, 2015, which is a continuation-in-part of U.S. patent application Ser. No. 14/494,047 filed Oct. 3, 2014, and is based on IN Application No. 201611004698, filed on 10 Feb. 2016, the entire contents of each of which are herein incorporated by reference.

BACKGROUND

Field

This disclosure relates to the field of data processing. More particularly, this disclosure relates to detecting a predetermined pattern in a stream of symbols.

Background

It is known to provide hardware accelerators for certain processing tasks. One target domain for such accelerators is natural language processing (NLP). The explosive growth in electronic text, such as tweets, logs, news articles, and web documents, has generated interest in systems that can process these data quickly and efficiently. The conventional approach to analyse vast text collections—scale-out processing on large clusters with frameworks such as Hadoop—incurs high costs in energy and hardware. A hardware accelerator that can support ad-hoc queries on large datasets, would be useful.

The Aho-Corasick algorithm is one example algorithm for exact pattern matching. The performance of the algorithm is linear in the size of the input text. The algorithm makes use of a trie (prefix tree) to represent a state machine for the search terms being considered. FIG. 1 of the accompanying drawings shows an example Aho-Corasick pattern matching machine for the following search terms, added in order: 'he', 'she', 'his' and 'hers'. Pattern matching commences at the root of the trie (state or node 0), and state transitions are based on the current state and the input character observed. For example, if the current state is 0, and the character 'h' is observed, the next state is 1.

The algorithm utilizes the following information during pattern matching:
  Outgoing edges to enable a transition to a next state based on the input character observed.
  Failure edges to handle situations where even though a search term mismatches, the suffix of one search term may match the prefix of another. For example, in FIG. 1, failure in state 5 takes the pattern matching machine to state 2 and then state 8 if an 'r' is observed.
  Patterns that end at the current node. For example, the output function of state 7 is the pattern 'his'.

Typically, to ensure constant run time performance, each node in the pattern matching machine stores an outgoing edge for all the characters in the alphabet being considered. Therefore, each node has branching factor of N, where N is the alphabet size. For example, for traditional ASCII, the branching factor is 128. However, storing all possible outgoing edges entails a high storage cost. A technique to reduce the required storage through bit-split state machines has been proposed by Tan and Sherwood (L. Tan and T. Sherwood. A High Throughput String Matching Architecture for Intrusion Detection and Prevention. In Computer Architecture, 2005. ISCA '05. Proceedings. 32nd International Symposium on, 2005). The authors propose the splitting of each byte state machine into n-bit state machines. Since the bit state machine only has two outgoing edges for each node, the storage requirement is reduced drastically. Each state in the bit state machine corresponds to one or more states in the byte state machine. If the intersection of all bit state machines maps to the same state in the byte state machine, a match has been found and is reported.

Since regular expression matching involves harder to encode state transitions, transition rules that offer greater degrees of flexibility may be used. Transition rules of the form <current state, input character, next state> can be used to represent state machine transitions for regular expression matching. Van Lunteren et al. (J. Lunteren, C. Hagleitner, T. Heil, G. Biran, U. Shvadron, and K. Atasu. Designing a programmable wire-speed regular-expression matching accelerator. In Microarchitecture (MICRO), 2012 45th Annual IEEE/ACM International Symposium on, 2012) use rules stored using the technique of balanced routing tables; this technique provides a fast hash lookup to determine next states. In contrast, Bremler-Barr and co-authors (A. Bremler-Barr, D. Hay, and Y. Koral. Compactdfa: Generic state machine compression for scalable pattern matching. In INFOCOM, 2010 Proceedings IEEE, 2010), encode states such that all transitions to a specific state can be represented by a single prefix that defines a set of current states. Therefore, the pattern-matching problem is effectively reduced to a longest-prefix matching problem.

SUMMARY

Viewed from one aspect this disclosure provides an apparatus comprising:
  pattern matching circuitry to detect instances of at least one predetermined pattern of symbols within a subject stream of symbols;
  encoding circuitry to generate an encoded stream of symbols in dependence on an input stream of symbols, wherein the encoding circuitry is configured to map a number of consecutive repetitions of a same pattern of one or more symbols detected within the input stream to a single instance of a symbol of the encoded stream and a corresponding repetition indicator indicative of said number of consecutive repetitions; and
  control circuitry to control the pattern matching circuitry to process the encoded stream of symbols generated by the encoding circuitry as the subject stream.

Viewed from another aspect this disclosure provides an apparatus comprising:
  symbol classifying circuitry to expand symbol identifiers of an input stream of symbols into expanded symbol identifiers including at least one additional bit indicative of whether a corresponding symbol is a member of a corresponding class of symbols; and
  pattern matching circuitry to detect whether the input stream satisfies at least one query condition using a plurality of bit matching state machines with each bit of the expanded symbol identifiers triggering a transition between two states of a corresponding one of said bit matching state machines, wherein the pattern matching circuitry is configured to identify whether a given query condition is satisfied by the input stream in dependence on the states reached by each of the bit matching state machines.

Viewed from another aspect this disclosure provides a computer-implemented pattern matching method, comprising:
  receiving an input stream of symbols;
  generating an encoded stream of symbols in dependence on the input stream of symbols, wherein a number of consecutive repetitions of a same pattern of one or more symbols detected within the input stream are mapped to a single instance of a symbol of the encoded stream and a corresponding repetition indicator indicative of said number of consecutive repetitions; and detecting instances of at least one predetermined pattern of symbols within the encoded stream of symbols.

Viewed from another aspect this disclosure provides a computer-implemented pattern matching method, comprising:

receiving an input stream of symbols identified by symbol identifiers;

expanding the symbol identifiers of the input stream into expanded symbol identifiers including at least one additional bit indicative of whether a corresponding symbol is a member of a corresponding class of symbols; and detecting whether the input stream satisfies at least one query condition using a plurality of bit matching state machines with each bit of the expanded symbol identifiers triggering a transition between two states of a corresponding one of said bit matching state machines, and identifying whether a given query condition is satisfied by the input stream in dependence on the states reached by each of the bit matching state machines.

The above, and other objects, features and advantages of this disclosure will be apparent from the following detailed description of illustrative embodiments which is to be read in connection with the accompanying drawings.

DRAWINGS

FIG. 3 illustrates example program instructions;

Figures 6, 7:
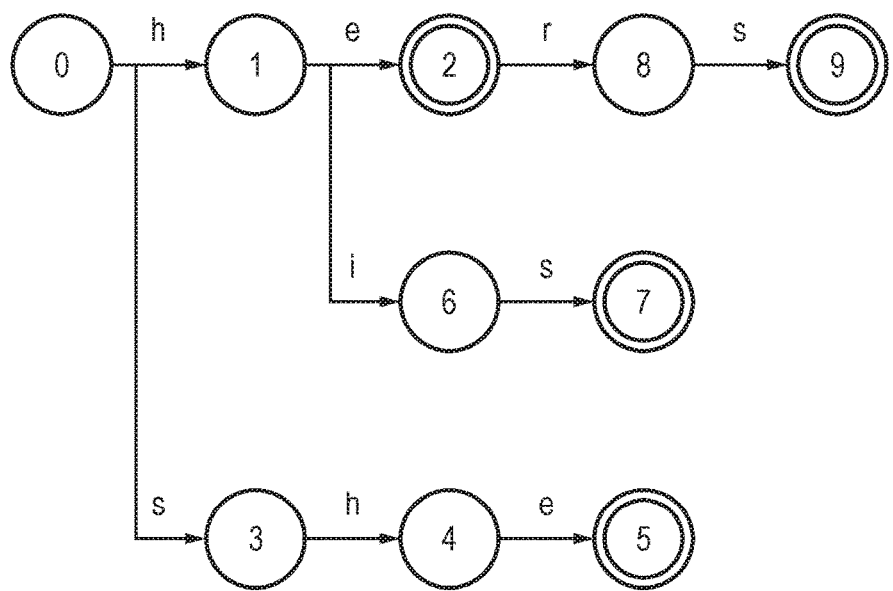
Figure 8:
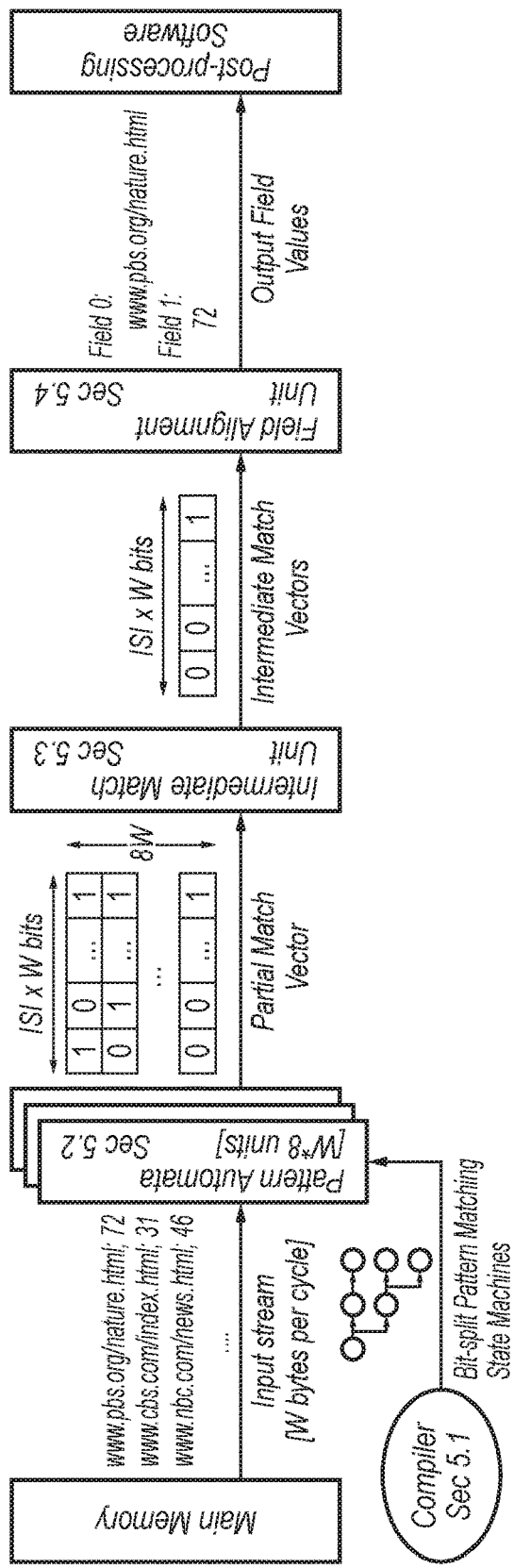
Figure 9:
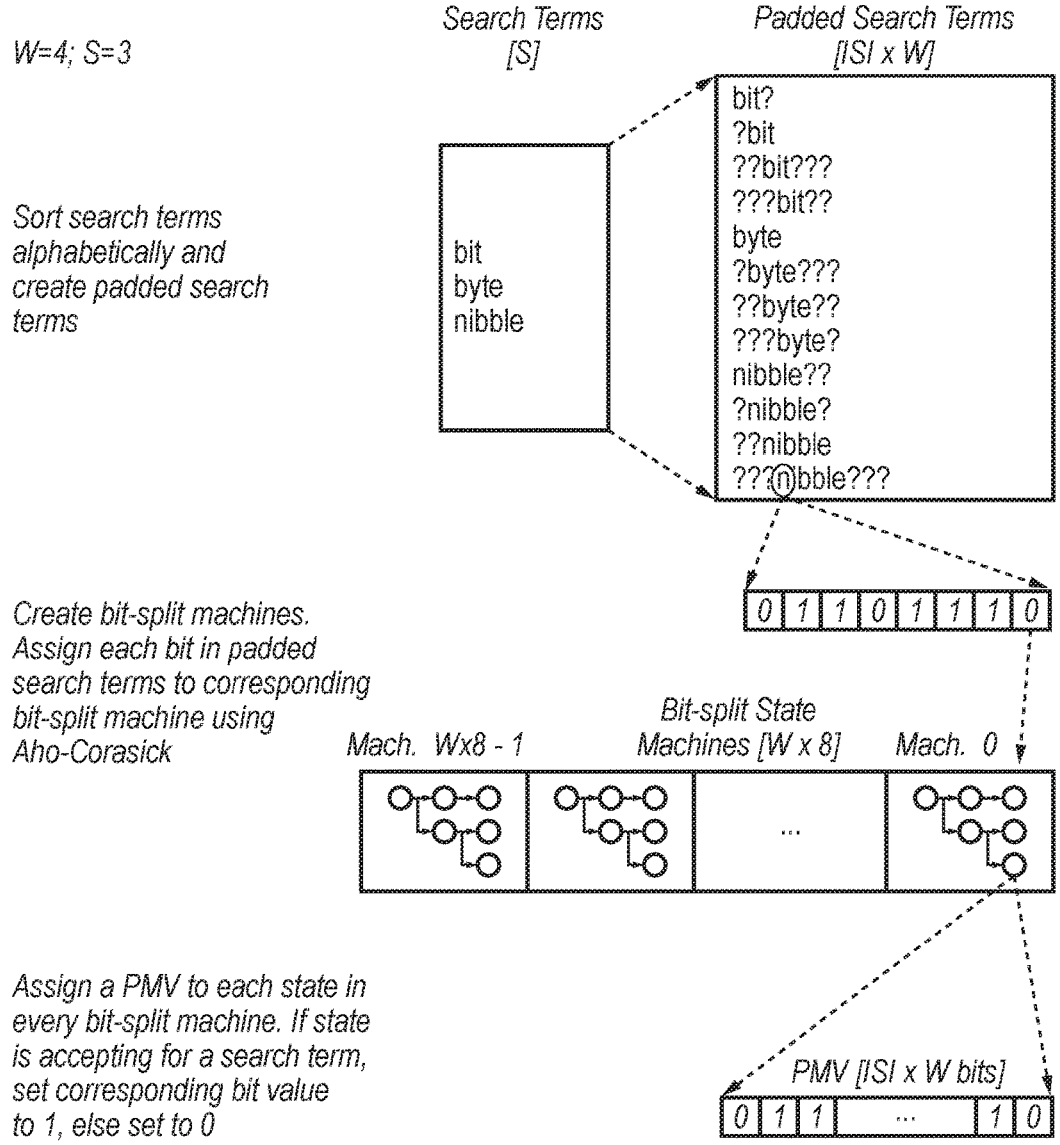
Figure 10:
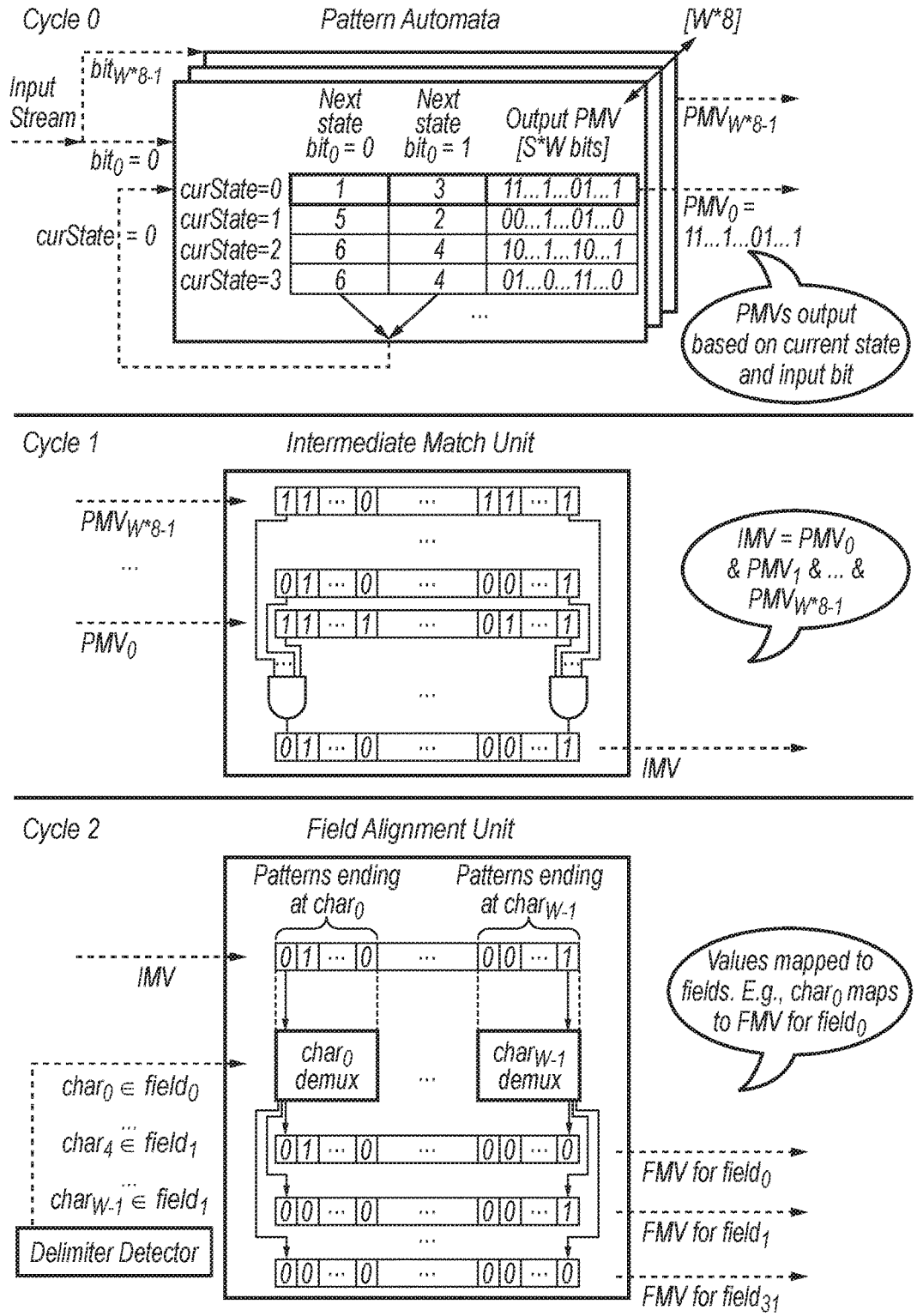
Figure 11:
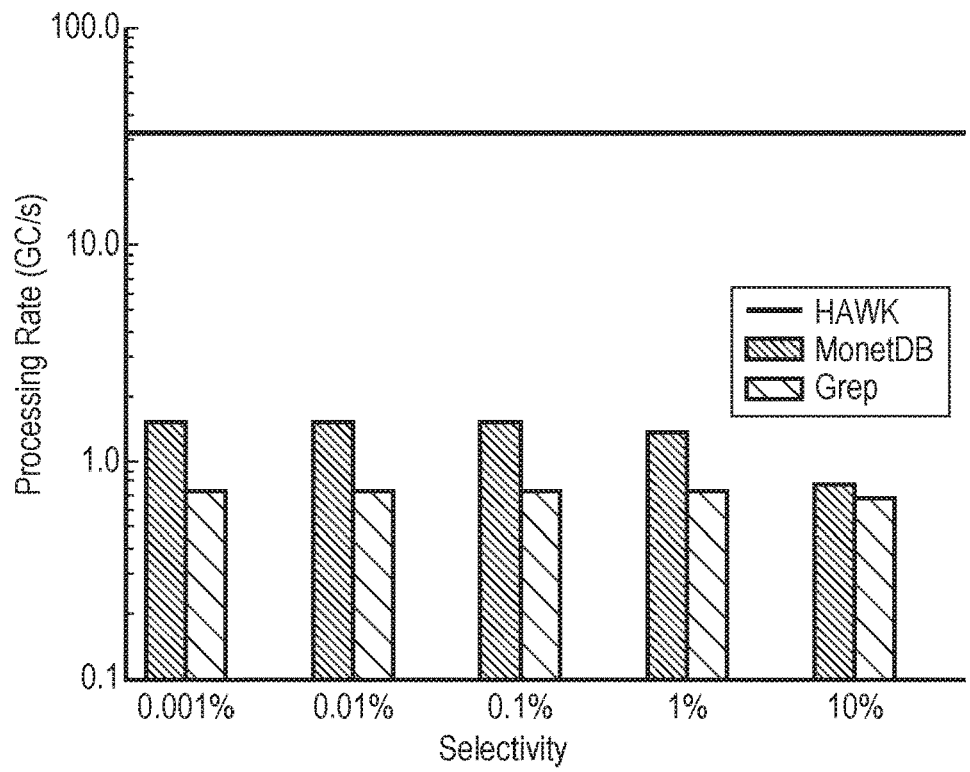
Figure 12:
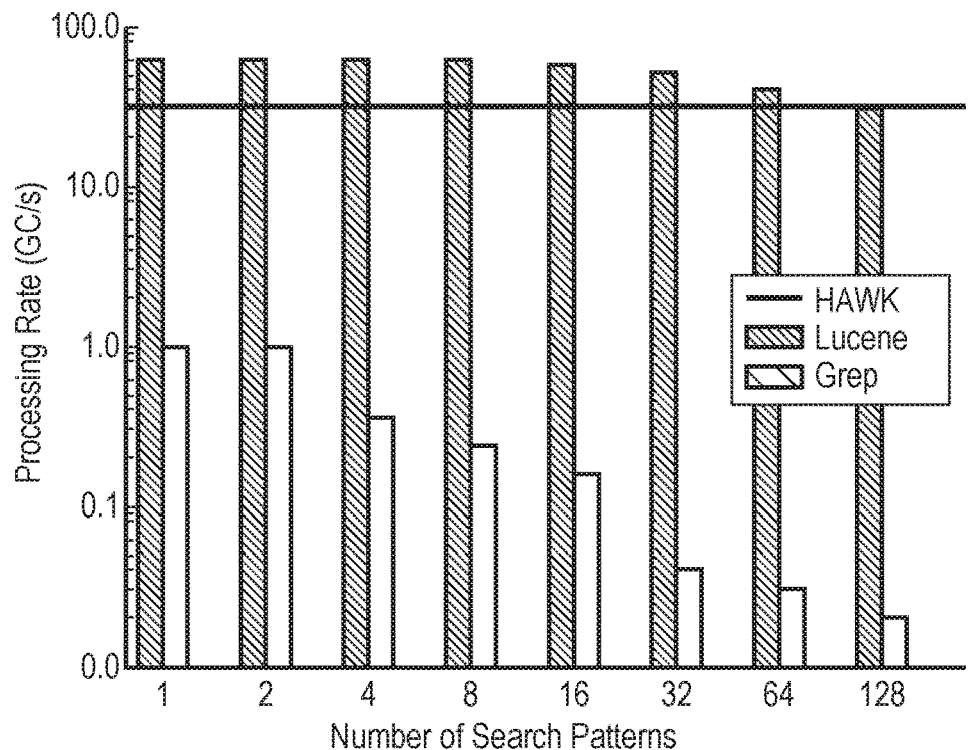
Figure 13:
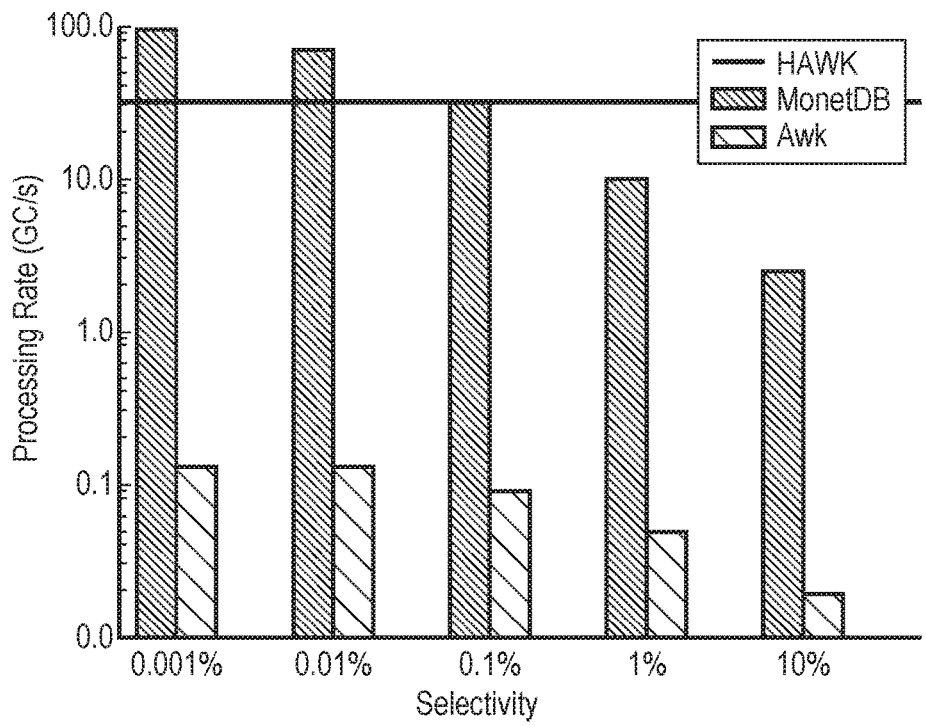
Figure 14:
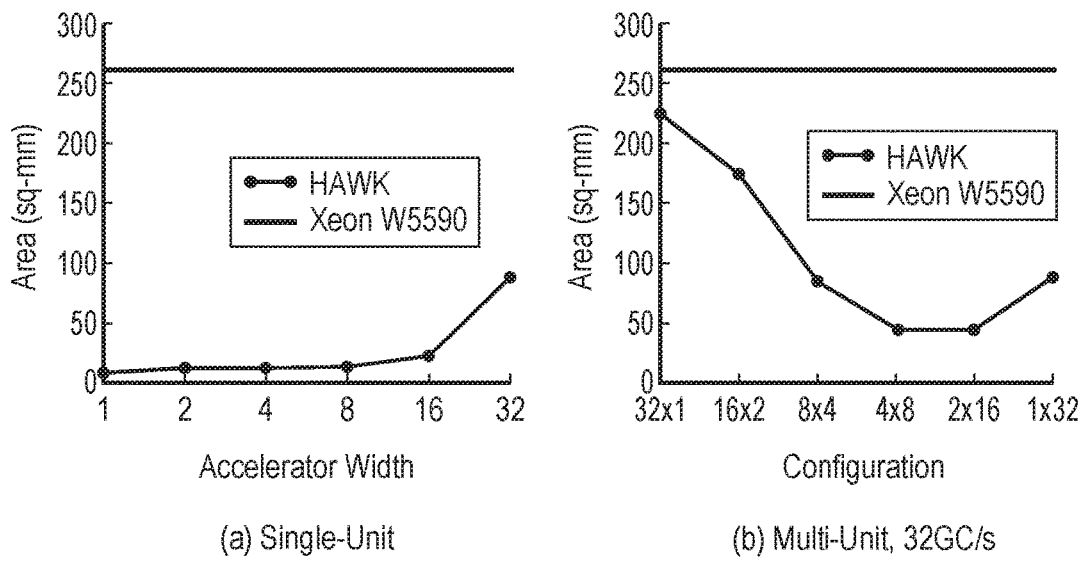
Figure 15:
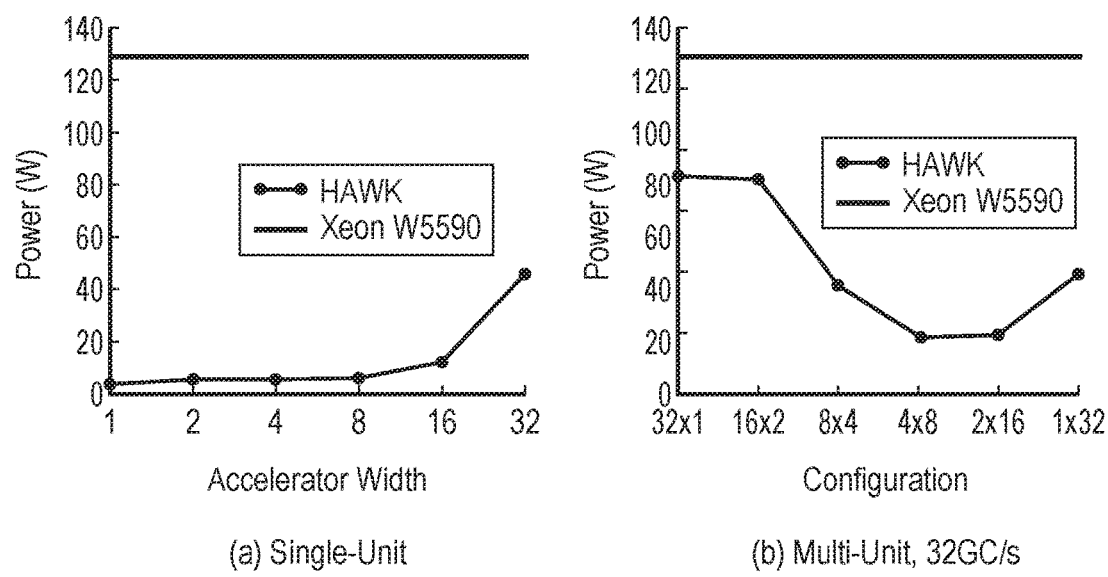
Figure 16:
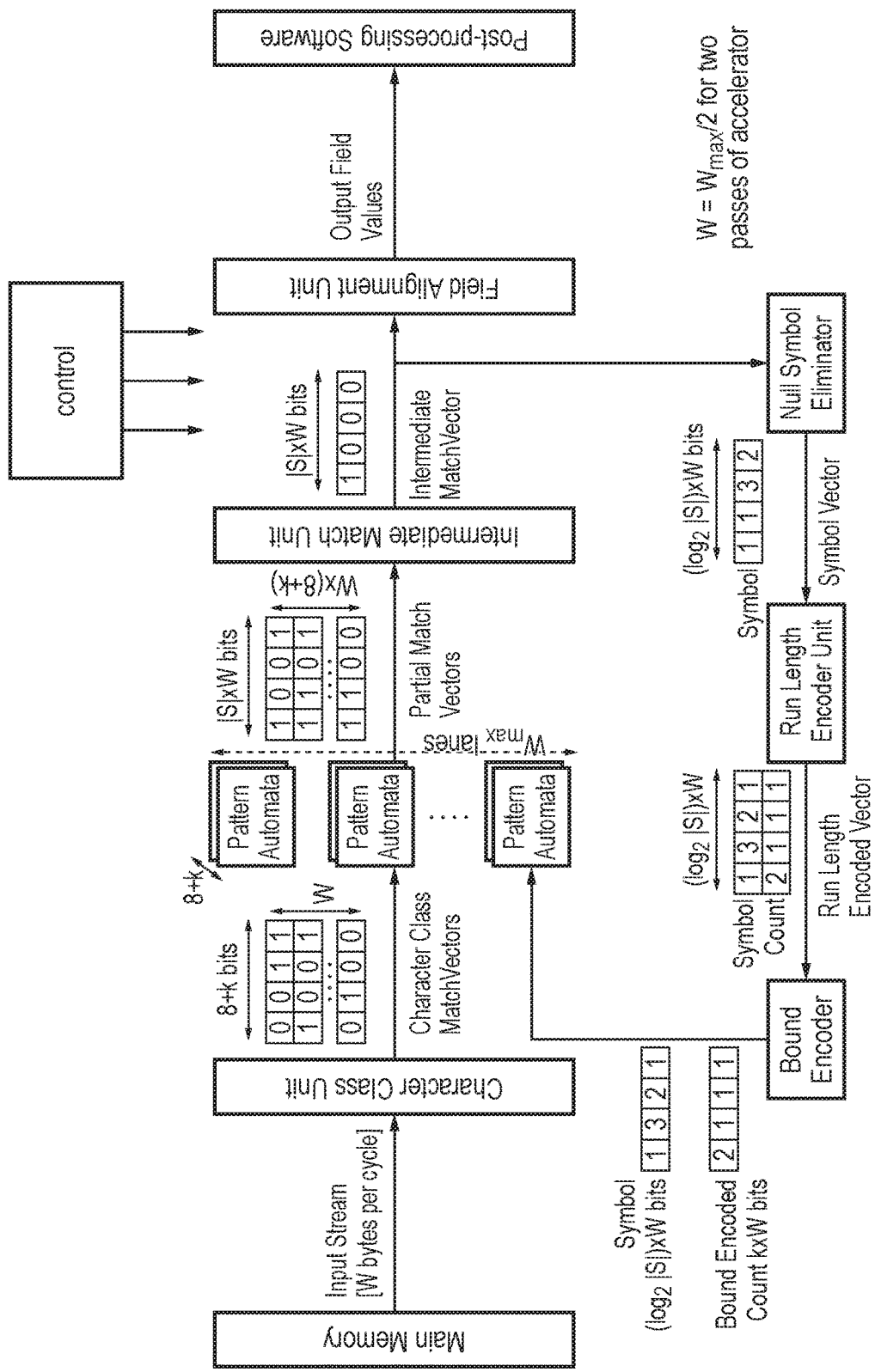
Figure 19:
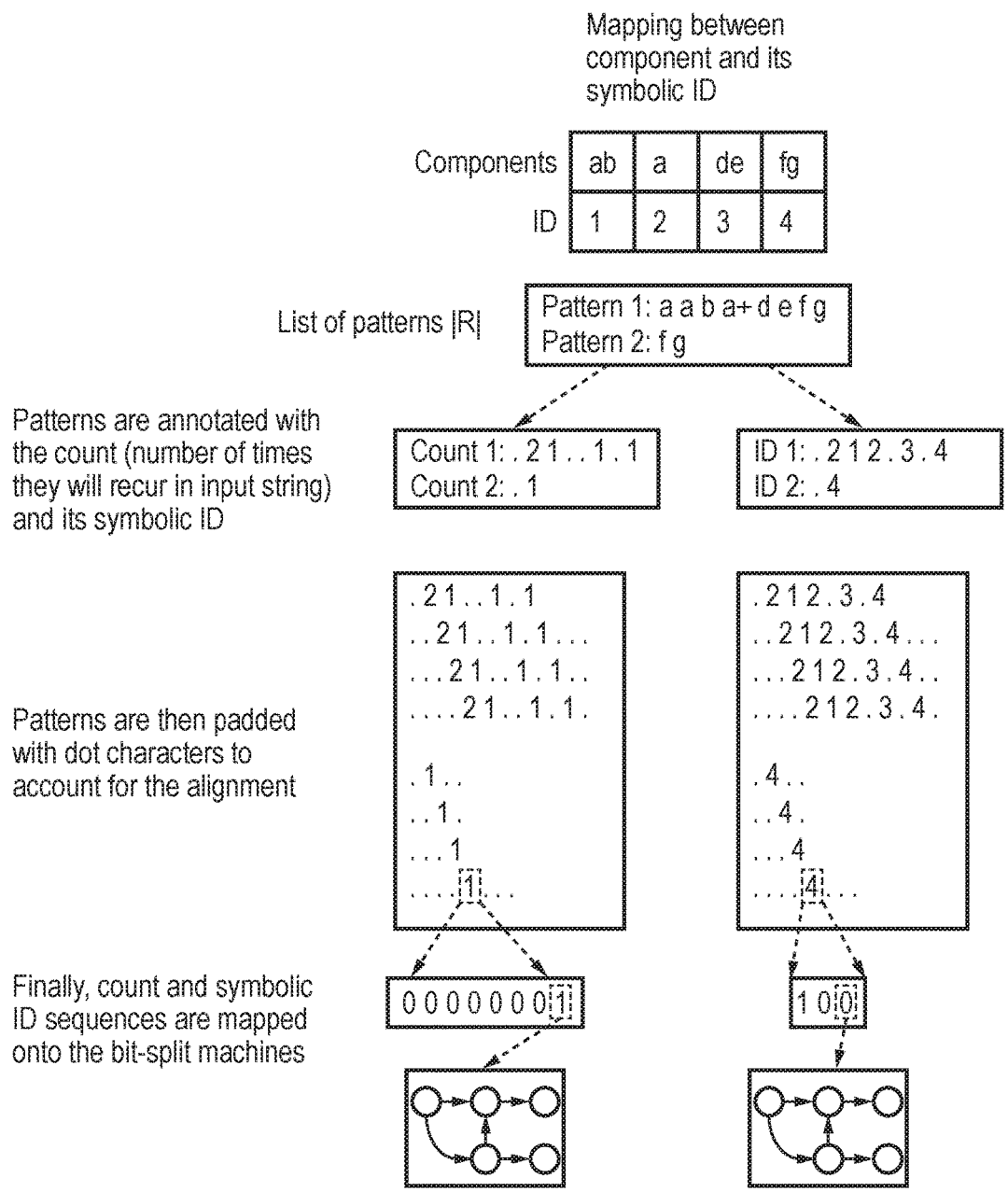
Figure 20:
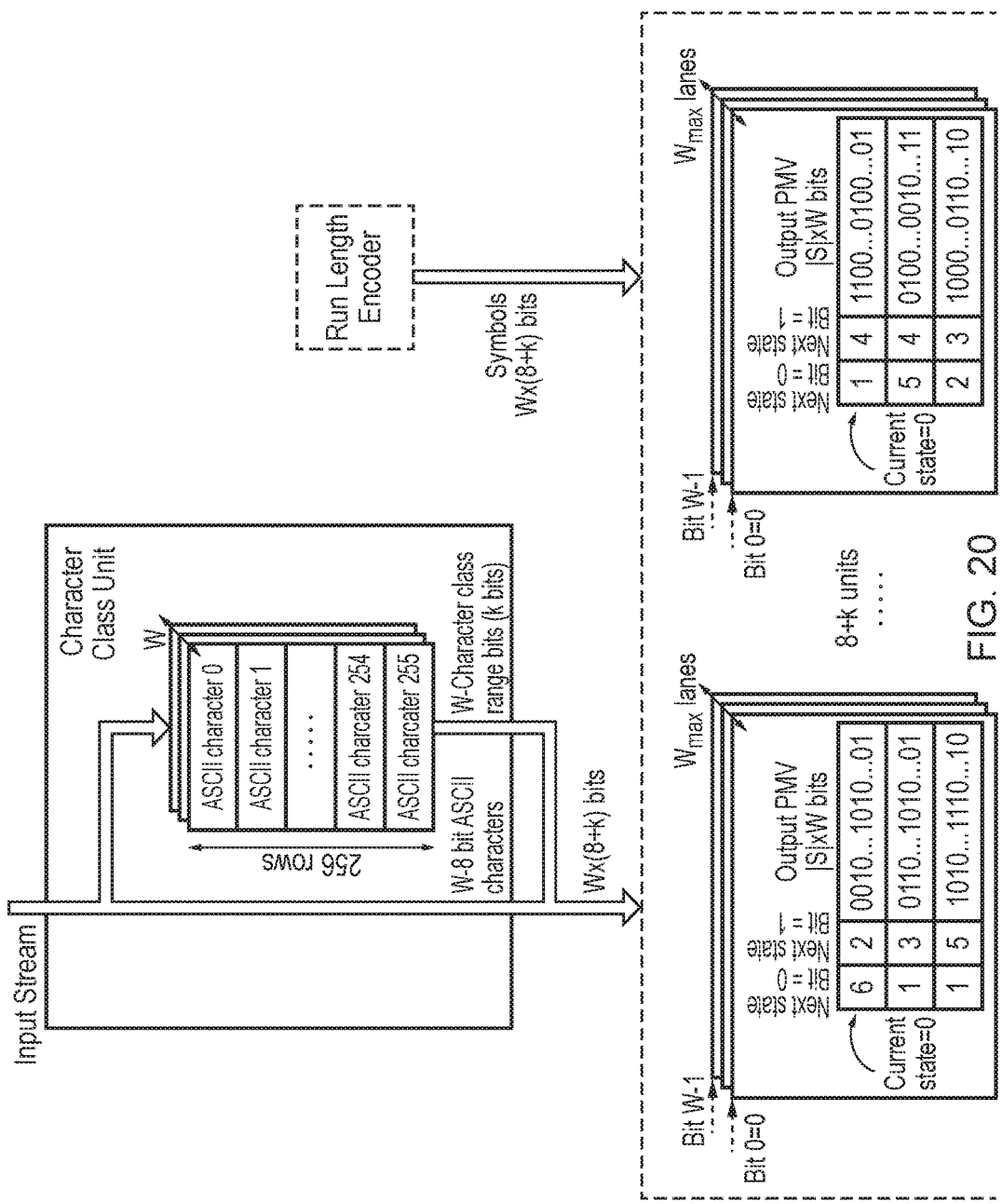
Figure 20:
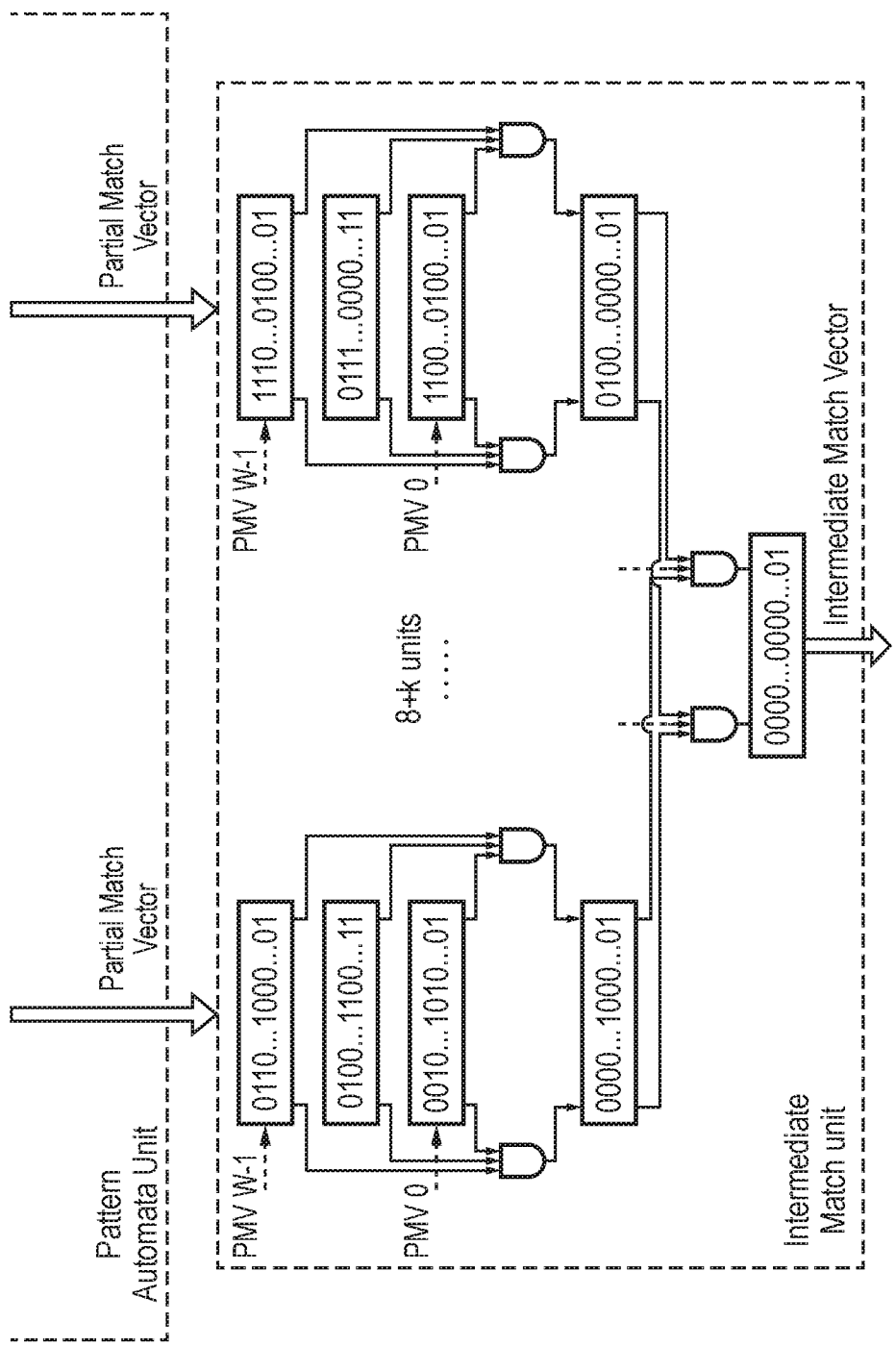
Figure 21:
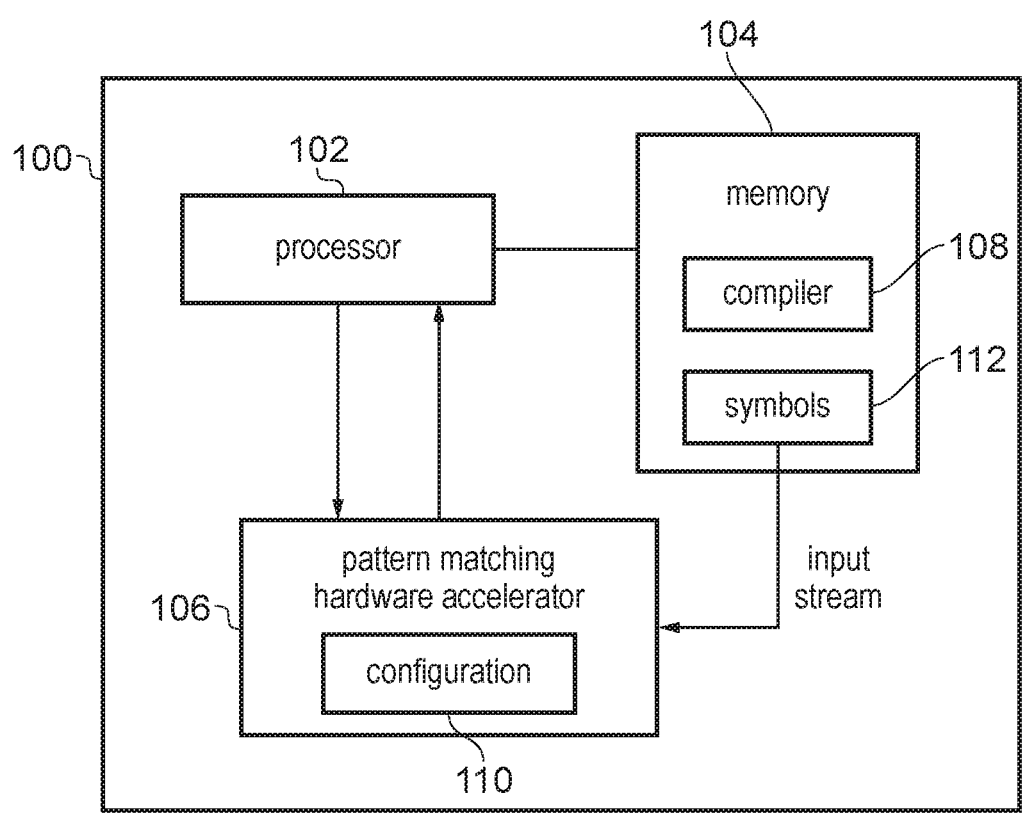
Figure 22:
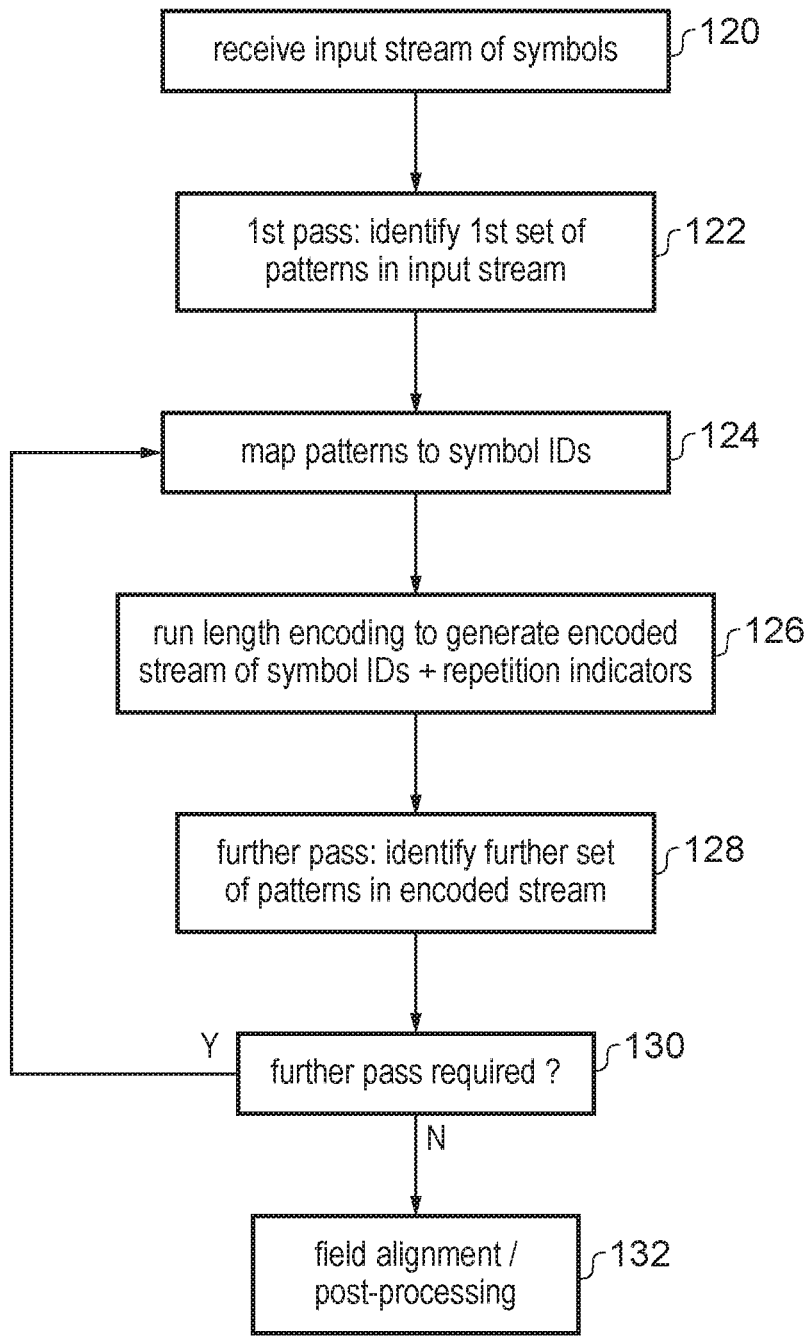
Figure 23:
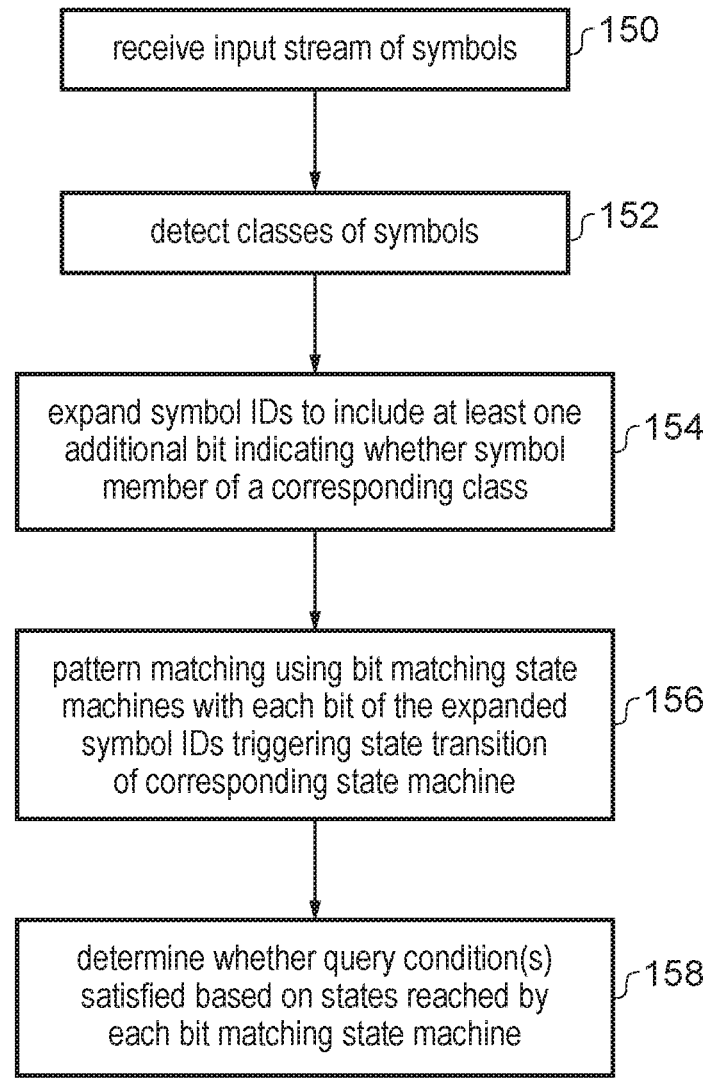

FIG. 6 schematically illustrates a sample log file;

FIG. 7 schematically illustrates an Aho-Corasick pattern matching automaton—search patterns are he, she, his and hers, states 2, 5, 7, and 9 are accepting states;

FIG. 8 schematically illustrates a block diagram of an accelerator architecture;

FIG. 9 schematically illustrates a three-step compiler operation for a 4-wide accelerator and three search terms (W=4, S=3);

FIG. 10 schematically illustrates operation of the major string matching subunits over three cycles;

FIG. 11 schematically illustrates query performance for the single pattern search task on synthetic data, across varying selectivities;

FIG. 12 schematically illustrates query performance on real-world text data, for varying numbers of search patterns;

FIG. 13 schematically illustrates query performance for complex predicates task, across varying selectivities;

FIG. 14 schematically illustrates area requirements for various accelerator widths and configurations (compared to a Xeon W5590 chip);

FIG. 15 schematically illustrates power requirements for various accelerator widths and configurations (compared to a Xeon W5590 chip);

FIG. 16 illustrates a second example of an accelerator architecture;

FIG. 17 illustrates an example of splitting regular expression patterns into components;

FIG. 18 illustrates an example of compiling components containing character classes;

FIG. 19 illustrates an example of annotating regular expression patterns with symbolic identifiers;

FIG. 20 illustrates an example of some of the accelerator subunits of FIG. 16 in more detail;

FIG. 21 schematically illustrates an example of an apparatus comprising processing circuitry and a programmable hardware accelerator for identifying patterns in an input stream of symbols;

FIG. 22 is a flow diagram illustrating a method of identifying predetermined patterns in a stream of symbols; and FIG. 23 is a flow diagram illustrating a method of identifying patterns including patterns based on classes of symbols.

EMBODIMENTS

Figure 1:
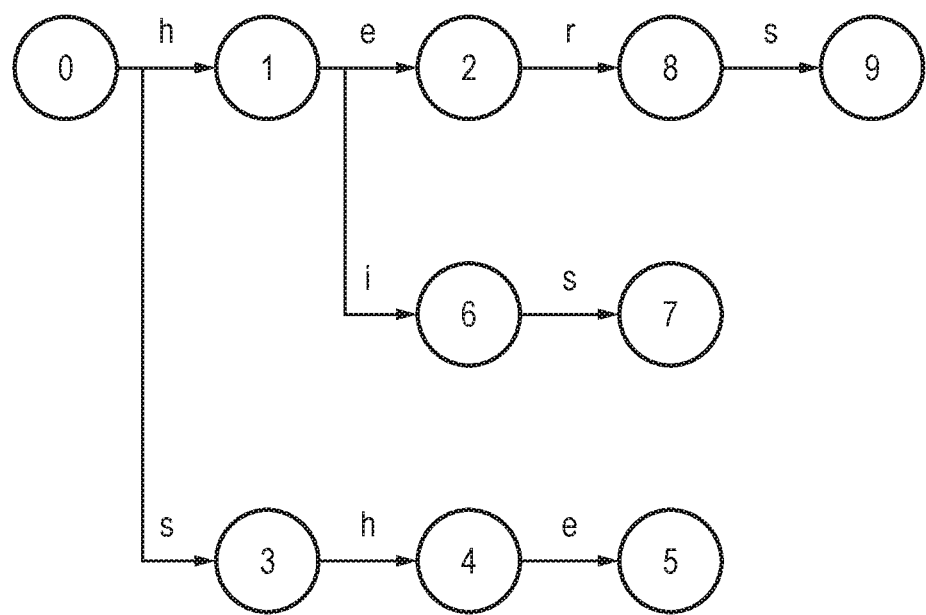
FIG. 1 illustrates an Aho-Corasick state machine.
Figure 2:
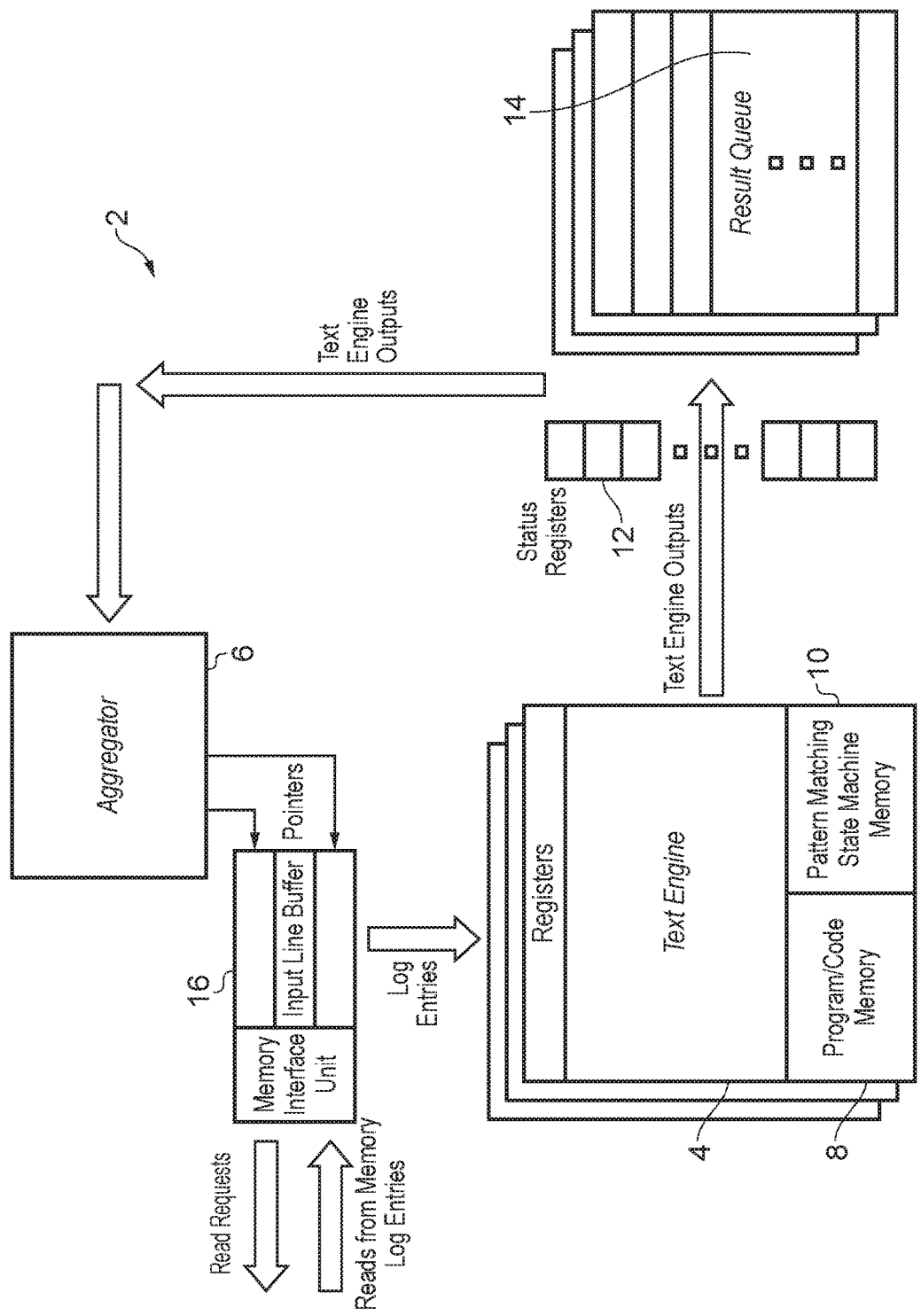
FIG. 2 illustrates a state machine architecture.

FIG. 2 shows the architecture of an accelerator design. The programmable accelerator 2 consists of a set of text engines 4 (TEs) (hardware execution units) which operate upon lines of the input log files and determine whether to accept or reject each line; status registers that list whether the TEs are running, have matched a line successfully, or failed at matching; result queues with 32-bit entries into which the TEs place their results when accepting a line; and, an aggregator 6 that post-processes the results written out by the TEs. User queries are converted into machine code (programs) by a compiler; these compiled queries are assigned to the TEs for further analysis. Compiled programs that do not fit fully within each TE's memory are split (sharded) across multiple TEs.

The compiler takes in user queries and generates programs that run on the text engines 4 (TEs). If a query is very large and entails a program whose size exceeds the TE memory, the compiler distributes the query across multiple programs; these programs are in turn distributed across multiple TEs. In addition to the program(s) associated with each query, the compiler also generates pattern matching state machines that are loaded on to each TE 4. Each pattern matching state machine is represented as a series of transition rules.

Text engines 4 (TEs) run compiled programs generated by the compiler for user queries. At a high level, each TE 4 consists of dedicated memory areas for programs 8 and pattern matching state machines 10, sixteen 32-bit general purpose registers, and hardware units that are responsible for running the compiled programs associated with user queries. Each TE 4 operates upon one line in the input log file at a time and returns a signal indicating whether the line is accepted or rejected. The aggregator 6 controls pointers (head pointer and tail pointer) into the input stream for each TE 4, and thereby controls availability of new lines for the TEs 4.

1) Program and Pattern Matching State Machine Memory:

Each TE contains 4 KB of program memory 8 and 8 KB of memory 10 dedicated to pattern matching state machines (the amounts of memory can vary). Any query that does not fit within the memory limits is distributed across multiple TEs 4. Each program consists of a sequence of custom instructions generated by the compiler. Pattern matching state machines, on the other hand, consist of sequences of transition rules. Each transition rule is of the form <current state, accepting state?, any character?, not character?, input character, next state, consume character?>. More details are provided in the appendices hereto. In some embodiments not all of these transition rules may be needed, e.g. "not character?" may not be needed 2) Instructions Supported: FIG. 3 Provides High-Level Descriptions of the Major Instructions Supported.

Each program that runs on a TE 4 is made up of a sequence of instructions, with the most notable instructions being matchString and matchNumber. Both instructions analyze the input stream one character at a time. Detailed descriptions of all instructions are provided in the appendices hereto.

matchString matches a specified string (represented by a corresponding pattern matching state machine) against the input stream. The pattern matching state machines, and therefore the instruction, support both exact string matches and regular expressions. The instruction advances the pattern matching state machine to its next state every cycle based on the current state and next input character seen. The pattern matching state machine indicates a match upon entering an accepting state. The pattern matching state machine also supports state transitions that do not consume input characters; such transitions help identify the end and beginning of adjacent fields in the input stream.

The matchString instruction exits when a mismatch occurs or a match is found. If a mismatch is found, the program rejects the input line, notifies the aggregator 6 via status registers 12, and requests the aggregator 6 for a new line to process. If a match is found, the TE 4 writes out information specified in the program to result queues 14 from where the results are read by the aggregator 6. The information written out by matchString includes pointers to the matching string in the input line. Alternatively, for a bit split implementation, match string may output the ID of the state that just matched.

matchNumber analyzes the input streams for numbers, and identifies any number within the stream as a number and determines the value of that number (stored to an output operand register). Some other instructions associated with matchNumber include checkNumber which verifies whether the number seen on the input stream is greater than, less than, or equal to a specified value, and math which can perform mathematical operations on the number derived from the input stream (including, for example, instruction hashing, CRC generation, or signature generation using the observed value(s)).

The aggregator 6 serves two major functions. First, the aggregator 6 post-processes the results written to the result queues 14 generated by the TEs 4. Second, the aggregator 6 controls a pointer into the input stream for each TE 4, and allocates lines to the TEs 4 for processing. To improve performance, multiple input lines are stored in a buffer 16 described below. As TEs 4 process lines and write their results out to the result queues 14, the aggregator 6 pops processed lines, moves the pointers into the buffer 16, and thereby controls the addition of new unprocessed lines to the buffer. By controlling the position of each TE's pointer into the input line buffer, the aggregator 6 maintains loose synchronization across the TEs 4. Stated another way, the aggregator 6 ensures that a TE may only run ahead of another TE by no more than the depth of the input line buffer 16. The aggregator 6 can be implemented in custom hardware, or can be implemented in software on a simple general-purpose processor. We assume the latter below. An extension to the ISA of the general purpose core facilitates interaction between the aggregator 6 and the result queues.

The input line buffer 16 is responsible for storing multiple log file entries read from memory. The buffer interfaces with memory via the memory interface unit. The memory interface unit sends out requests for cache line sized pieces of data from memory. The memory interface unit uses the aggregator's TLB for its addressing-related needs. Whenever an entry in the input line buffer 6 becomes available, the memory interface unit sends out a read request to the memory hierarchy. When the requested data is returned from memory, the vacant entry in the input line buffer 6 is written to. Pointers into the input line buffer from the aggregator 6 control the requests for new data from the input line buffer.

Each logical TE 4 can write its results (i.e., registers) to its result queue 14. The result queue 14 is read by the aggregator 6 for subsequent processing of the entries. Once all the results associated with an input line have been read and processed by the aggregator, the pointers from the aggregator 6 into the input line buffer 16 are updated, and the entry can be overwritten by fresh lines from memory.

A few adjustments can be made to the design to improve performance.

A content addressable memory (CAM) to store the pattern matching state machines. The CAM enables access to matching transition rules within one cycle (as opposed to having to iterate through all the potentially matching transition rules over multiple cycles).

rProvision to allow for multiple characters to be evaluated per cycle. This feature is relevant for exact string matches, and uses comparators that are multiple bytes wide.

tAccelerator provides for the acceptance or rejection of a line by the TEs 4 at an early cycle.

Once the accept or reject decision has been communicated to the aggregator 6, the TE 4 proceeds to work on the next available line. However, this feature depends upon the quick detection of end of line characters in the input line buffer. This may be assisted through the use of N bytewide comparators, where N is equal to the width of the memory transaction size in bytes (i.e. cacheline size in bytes).

dPattern matching state machines can be stored more efficiently using bit-split state machines as proposed by Tan and Sherwood. The accelerator uses this algorithm to store exact match state machines.

More generally the TEs 4 may be programmed to select on a per-character basis which one of a plurality of different query algorithms to use, e.g. per-character pattern matching (e.g. Aho-Corasick), per-bit pattern matching (e.g. Tan and Sherwood) or a CAM based algorithm where multiple patterns are matched in parallel.

Figure 4:
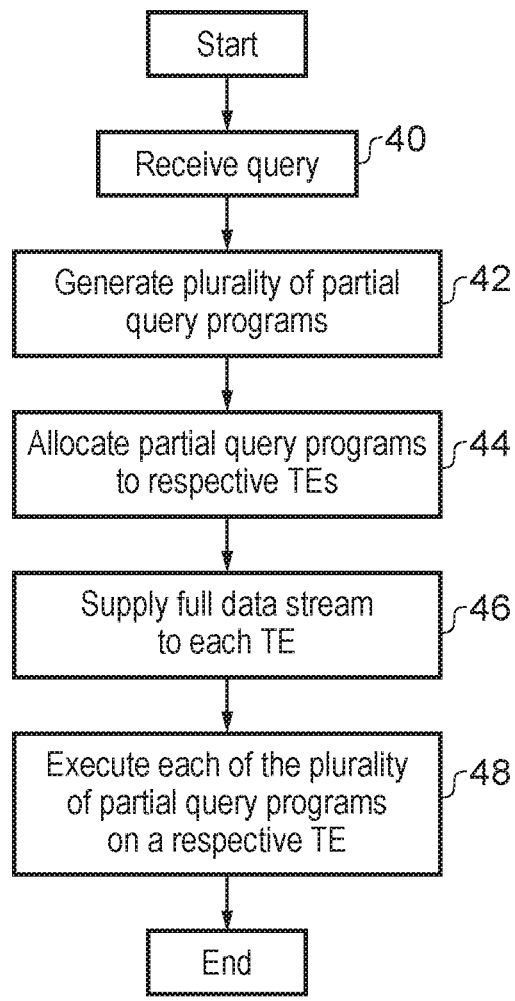
FIG. 4 is a flow diagram illustrating accelerator programming.

FIG. 4 schematically illustrates a flow diagram showing how a received query is divided (sharded) into a plurality of partial query program. At step 40 a query to be performed is received. Step 42 divides then receives query into a plurality of partial query programs. These partial query programs are selected such that they will have program instruction and state machine requirements which can be accommodated by an individual TE. Each of these partial query programs receives the full set of input data (the full stream of input characters) as an input to its processing. This technique can be considered to provide Multiple Program Single Data operation (MPSD). The multiple programs are different from each other in the general case, but together combine to provide the overall operation of the query receives at step 40. At step 44 the partial query programs are allocated to respective TE's for execution. At step 46 the full data stream is supplied to each TE. Accordingly, each TE receives the same input data. An individual TE may early terminate its access to the full stream of input data and so may not actually process all of the stream of input data. Nevertheless, the same full set of input data is available as an input, if required, by each of the TEs. At step 48, each of the plurality of partial query programs is executed by a respective TE using the full data stream supplied at step 46. It will be appreciated that in practice the steps 46 and 48 may be conducted in parallel with the full data stream being supplied in portions as the plurality of partial query programs are undergoing continuing execution by their respective TEs.

Figure 5:
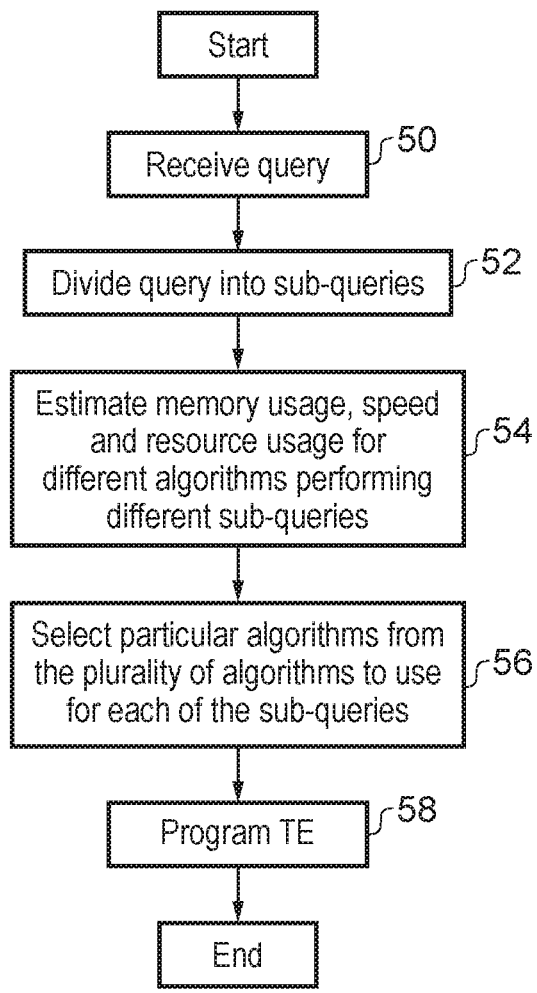
FIG. 5 is a flow diagram illustrating query algorithm selection.

FIG. 5 is a flow diagram schematically illustrating how different query algorithms may be selected to perform different portions of a query operation. As previously mentioned the different query algorithms may be selected for use with different portions of an overall query to be performed Each of the different algorithms can have associated advantages and disadvantages. As an example, the per-character pattern matching may be relatively storage efficient and be capable of being used to express a wide variety of different types of query, but may suffer from the disadvantage of being relatively slow to execute and potentially require the use of a hash table in order to access the data defining its state machines. A per-bit pattern matching algorithm may also be storage efficient and may be faster than a per-character pattern matching algorithm. However, a per-bit pattern matching algorithm is generally not amenable to performing queries other than those corresponding to exact matches. A content addressable memory based algorithm may have the advantage of being fast to operate, but has the disadvantage of a high over head in terms of circuit resources required and energy consumed.

Returning to FIG. 5, step 50 receives the query to be performed. This may be a full query or a partial query that has already been allocated to a particular TE. Step 52 divides the query received into a plurality of sub-queries whose performance for each of a plurality of different possible implementation algorithms may be evaluated. At step 54 the performance characteristics (e.g. memory usage, speed, resource usage etc.) for each of the plurality of different candidate algorithms in performing the different sub-queries is determined. Step 56 then serves to select particular algorithms from the plurality of algorithms to use for each of the sub-queries. The selection may be made so as to meet one or more of a program storage requirement limit of the TEs, a processing time limit and/or a hardware resources limit of the one or more TEs (e.g. CAM storage location availability). At step 58 the TE concerned is programmed. The algorithm used may be varied as the TE progresses through the portion of the query processing allocated to it. The algorithm used may be varied on a per-character (or per group of character) basis as the sequences of characters are queried. In practice, the switching between the algorithms is likely to be less frequent than on a per-character basis.

The stream of character data with which the present techniques operate may be unindexed data. Such data (e.g. an unindexed sequence of character data, unindexed log data etc) provides a difficult query target for convention query mechanisms and accordingly the present techniques may provide improved querying performance for such data.

The aggregating which is performed by the aggregator 6 may be performed as a single processing operation upon a plurality partial results as generated by each TE. For example, the aggregator 6 could OR together a large number of partial results. AND together a large number of partial results, perform a mathematical operation upon a large number of partial results, or some other combination of logical or other manipulations upon the results. The aggregator 6 performs such processing upon the partial results as a single process, e.g. executing a single instruction or a small number of instructions.

The buffer 16 of FIG. 2 may include a delimiter store. As data is stored into the buffer 16, delimiter identifying circuitry serves to identify data delimiters between portions of the sequenced data as it is loaded. The delimiters may, for example, be end of line characters or other characters which delimit portions of the sequence of data. These portions may be irregular in size. The delimiter store may be accessed by the aggregator 6 in order to determine the start of a next portion of the sequence of data to be supplied to a TE 4 when it completes processing the current portion it is operating upon. This can speed up the operation of accelerator 2 by avoiding the need to search through the sequence of data to identify the start and end of each portion of that data which is supplied to a TE. Instead, the delimiters may be identified once at load time and thereafter directly referred to by the aggregator 6. As previously mentioned, the different TEs 4 are free to query different portions of the data within the buffer 16 within the limits of the data held within the buffer 16. This keeps the TEs in loose synchronization. The aggregator 6 stores a head pointer and a tail pointer. The head pointer indicates the latest portion of the full data stream which has been loaded by the memory interface unit into the buffer from the main memory. The tail pointer indicates the earliest portion of the sequence of data for which pending processing is being performed by one of the TEs. Once the tail pointer moves beyond a given portion, that portion is then a candidate for being removed from the buffer 16.

As mentioned above, the TEs 4 support a matchNumber instruction. This is a number match program instruction and serves to identify a numeric variable and to determine a value of that numeric valuable located at a variable position within a sequence of characters. The numeric variable may take a variety of forms. For example, it may be an integer value, a floating point value or a date value. Other forms of numeric variable are also possible. The output of number match program instruction may comprise a number value stored within a register specified by the number match program instruction. This may be a selectable output register.

The performance of the accelerator 2 is compared against CPU based solutions for a variety of benchmarks. In the experiments the datasets and queries presented by Pavlo and co-authors are used (A. Pavlo, E. Paulson, A. Rasin, D. J. Abadi, D. J. DeWitt, S. Madden, and M. Stonebraker. A comparison of approaches to large-scale data analysis. In Proceedings of the 2009 ACM SIGMOD International Conference on Management of Data, SIGMOD '09, 2009). The following tasks and datasets described below are considered and used to evaluate the design using simulator. The number of simulator cycles are counted for a task, and the time required calculated for the task assuming a frequency of 1 GHz (other frequencies could also be used).

The expected performance of the design as reported by the simulator is compared against the time measured for each task on a Xeon-class server. Since 'awk' provides the functionality most relevant to the queries below, we utilize 'awk' on the real machine.

A. Task 1: Selection

Pavlo et al.'s dataset for the selection task consists of documents with the following structure <Page Rank, URL, Duration>. As in Pavlo et al., the present test query takes the form of select 'Page Rank, URL' where 'Page Rank>10'. The likelihood of a Page Rank being above 10, is almost 0.23%. Since the present design aims to rapidly reject or accept lines and then move to the next line, the last field in each line that is to be evaluated plays an important role in the performance of the design. Therefore, the following considers the query, select 'URL, Duration' where 'Page Rank>10' to evaluate a scenario where the last character of each line is to be evaluated.

B. Task 2: Grep

For the 'grep' task, the dataset consists of multiple 100-byte lines. Each 100-character line consists of a 10 character unique key, and a 90-character random pattern. The 90-character random pattern is chosen such that the string being searched for only occurs once per 30,000 lines. The query for the accelerator 2 in this case is: select line where line=="*XYZ*". Note that for this query, all characters in a line are to be evaluated if a match is not found.

C. Task 3: Aggregation

The aggregation task utilizes a dataset that consists of lines of the form <Source IP, Destination URL, Date, Ad Revenue, User, Country, Language, Search Word, Duration>. The task aims to calculate the total ad revenue associated with source IP, grouped by the source IP. Since the group by functionality is something that the aggregator takes care of, the query for the text engines is select 'Source IP, Ad Revenue'. Given the ad revenue value that gets returned to it, the aggregator can perform the group by operation using hash-tables.

Illustrative Y Results

Preliminary results obtained by comparing the performance of the simulated design versus running 'awk' on a real machine for the tasks listed in herein are discussed. The accelerator's 2 ability to reject or accept a line early provides advantages. Additionally, the accelerator 2 when evaluating more than one character per cycle provides significant advantages compared to CPU-based solutions.

A. Task 1: Selection

Consider the results for the query, select 'Page Rank, URL' where 'Page Rank>10' for the selection task. Recall that the dataset for this query consists of documents with the following structure <Page Rank, URL, Duration>.

| Accelerator Runtime (s) | 0.02 |
| Awk Runtime (s) | 1.5 |
| Speedup | 92× |

Next, we consider the results for the query, select 'URL, Duration' where 'Page Rank>10'.

| Accelerator Runtime (s) | 0.22 |
| Awk Runtime (s) | 1.5 |
| Speedup | 6.7× |

As shown in tables above (the precise values may vary depending upon the exact parameters used), the accelerator 2 shows almost a two orders of magnitude speedup compared to the CPU-based solution when Page Rank is selected. The main reason for the improved performance is the fact that the accelerator 2 is designed to reject or accept a line as soon as the last field that requires evaluation has been evaluated. Since only the first two fields are to be evaluated in this case, a line can be accepted or rejected as soon as the URL field has been completely seen. Further, since the likelihood of finding an acceptable Page Rank is only 0.23%, many lines are rejected as soon as the Page Rank field has been evaluated and found to mismatch.

However, in the case where Duration has to be selected, the third field has to be completely seen before any accept or reject decision can be made. Additionally, the likelihood of a line having an acceptable Duration value is almost 385× the likelihood of finding an acceptable Page Rank. This, in turn, increases the number of characters that are to be evaluated.

B. Task 2: Grep

Next, the results for the query, select line where line=="*XYZ*", for the grep task are considered. The dataset for this query consists of lines with 100-characters each. Each line consists of a 10 character unique key, and a 90-character random pattern.

| Accelerator Runtime (s) | 0.19 |
| Awk Runtime (s) | 0.41 |
| Speedup | 2× |

As with the second selection query, the grep query requires the entire line to be evaluated in the worst case. Since the likelihood of finding a matching a line is 1/30,000, most lines are read completely before being rejected. While the speedup value for the grep task is not very high, it is noted that the pattern matching state machine for this task (query) is rather small. With large pattern matching states machines that do not fit within CPU caches, we expect the speedup afforded by the accelerator to be significantly higher.

C. Task 3: Aggregation

Finally, the results for the query, select 'Source IP, Ad Revenue' executed on a dataset of the form <Source IP, Destination URL, Date, Ad Revenue, User, Country, Language, Search Word, Duration> are considered (the precise values may vary depending upon the parameters used).

| Accelerator Runtime (s) | 0.01 |
| Awk Runtime (s) | 0.15 |
| Speedup | 15.7× |

Again, the feature that the accelerator can reject lines early provides a significant advantage, and the speedup compared to 'awk' running on a Xeon-core is almost 16.

A further example embodiment will now be described below with reference to FIGS. 6 to 15.

High-velocity text data have undergone explosive growth in recent years and will continue to do so. Traditional software-based tools for processing these large text corpora use memory bandwidth inefficiently due to software overheads and thus fall far short of peak scan rates possible on modern memory systems. In the following is described HAWK, a custom hardware accelerator for ad hoc queries against large in-memory logs. HAWK is designed to process data at a constant rate of 32 GB/s—faster than most extant memory systems. HAWK outperforms known software solutions for text processing. HAWK occupies an area of 45 mm2 in its pareto-optimal configuration and consumes 22 W of power, well within the area and power envelopes of modern CPU chips.

Introduction

High-velocity electronic text log data—such as system logs, social media updates, web documents, blog posts, and news articles—have undergone explosive growth in recent years [25]. These textual logs can hold useful information for time-sensitive domains, such as diagnosing distributed system failures, online ad pricing, and financial intelligence.

For example, a system administrator might want to find all HTTP log entries that mention a certain URL. A financial intelligence application might search for spikes in the number of Tweets that contain the phrase can't find a job. Queries on this high-velocity text data are often ad hoc, highly-selective, and latency-intolerant. That is, the workload is not known ahead of time; the queries often ignore the vast majority of the corpus; and query answers should be generated quickly and reflect up-to-the-second data.

Memory-resident databases have recently become a popular architectural solution, not simply for transactional [17, 28] workloads but for analytical ones [19, 26, 27, 35] as well.

Storing data in RAM admits fast random seeks and fast scan behavior, potentially making such databases good matches for ad hoc and latency-intolerant log query systems. Although RAM storage costs are higher than other technologies, they are falling over time and are likely already acceptable for many datasets. (E.g., Twitter's own search engine now stores recent data in RAM [8].)

Because time constraints and varied workloads make index construction impractical, the ad hoc log query system's performance will depend on its ability to scan and select from the contents of memory. When performing an in-memory scan-and-select on traditional modern hardware, memory bandwidth—the rate at which the architecture supports transfers from RAM to the CPU for processing-sets an upper bound on the speed of the scan.

Unfortunately, existing systems and tools do not come close to saturating available memory bandwidth. For example, for a state-of-the-art in-memory database, may have a peak scan rate of 2 GB/s of data, far short of the 17 GB/s RAM-to-CPU DDR3 channel offered by modern architectures. Non-database textual tools, such as grep and awk, perform even worse, sometimes by orders of magnitude. The gap arises because these tools execute many instructions, on average, for each character of input they scan. Thus instruction execution throughput, rather than memory bandwidth, becomes the performance limiter. Nor is it clear that growth in CPU cores can solve the problem, as memory bandwidths also continue to improve (e.g., with the proliferation of DDR4).

System Goal—there are many questions to answer when building an in-memory analytical database, but the following system focuses on one: can we saturate memory bandwidth when processing text log queries? If so, the resulting system could be used directly in grep- and awk-style tools, and integrated as a query processing component in memory-resident relational systems.

Of interest are designs that include both software and hardware elements. Although hardware accelerators have had a mixed history in data management systems, there is reason to be newly optimistic about their future. The anticipated end of CMOS voltage scaling (a.k.a. Dennard scaling) has led experts to predict the advent of chips with "dark silicon"; that is, chips that are designed to have a substantial portion powered down at any given time [5, 11, 24, 31]. This forecast has renewed interest in domain specific hardware accelerators that can create value from otherwise dark portions of a chip-accelerators powered only when especially needed. Researchers have recently proposed several hardware designs tailored for data management [14, 34]. Further, recently-announced chip designs include field programmable gate array (FPGA) elements [7], making a domain-specific hardware accelerator—implemented in FPGAs—more practical and promising. There has also been substantial recent interest in using FPGAs for database query processing [13, 20, 32, and 33].

Technical Challenge—it is not surprising that current software systems on standard cores perform poorly. Most text processing systems use pattern matching state machines as a central abstraction, and standard cores that implement these machines in software can require tens of instructions per character of input. Further, there is a central challenge in efficiently representing state machines for large alphabets and complex queries; the resulting transition matrices are sparse, large, and randomly accessed, leading to poor hardware cache performance.

In this work, we set an objective of processing in-memory ASCII text at 32 giga-characters per second (GC/s), corresponding to a 32 GB/s data rate from memory-a convenient power of two expected to be within the typical capability of near-future high-end servers incorporating several DDR3 or DDR4 memory channels. We investigate whether a custom hardware component can reach this performance level, and how much power and silicon area it takes. Achieving this processing rate with conventional multicore parallelism (e.g., by sharding the log data into subsets, one per core) is infeasible; measurements of a state-of-the-art in-memory database suggest that chips would require nearly 20× more cores than are currently commonplace in order to reach this level of performance.

Proposed Approach—a combination of a custom hardware accelerator and an accompanying software query compiler for performing selections queries over in-memory text data. When the user's query arrives, the compiler creates a pattern matching finite state automaton that encodes the query and transmits it to the custom hardware component; the hardware accelerator then executes it, recording the memory addresses of all text elements that satisfy the query. This list of results can then be used by the larger data management software to present results to the user, or as intermediate results in a larger query plan.

The present disclosure exploits two central observations to obtain fast processing while still using a reasonable hardware resource bud-get. First, the accelerator is designed to operate at a fixed scan rate: it always scans and selects text data at the same rate, regardless of the data or the query, streaming data sequentially from memory at 32 GB/s. Such performance predictability can be achieved because the scan engine requires no control flow or caches; hence, the hardware scan pipeline does not stall and can operate at a fixed 1 GHz frequency, processing 32 input characters per clock cycle. This approach allows the system to avoid the cache misses, branch mispredictions, and other aspects of CPUs that make performance unpredictable and require area-intensive hardware to mitigate.

Second, the system uses a novel formulation of the automata that implement the scan operation, thereby enabling a hardware implementation that can process many characters concurrently while keeping on-chip storage requirements relatively small. This conceptually concatenates 32 consecutive characters into a single symbol, allowing a single state transition to process all 32 characters. Naively transforming the input alphabet in this way leads to intractable state machines—the number of outgoing edges from each state is too large to enable fixed-latency transitions. So, the system leverages the concept of bit-split pattern matching automata [30], wherein the original automaton is replaced with a vector of automata that each processes only a bit of input. As a result, each per-bit state requires only two outgoing transitions. Matches are reported when the vector of automata have all recognized the same search pattern.

Contributions and Outline—the core contributions of this disclosure are as follows:
1. There are described a typical log processing query workload, describe known possible solutions (that are unsuitable), and there is provided some background information about conventional approaches (Sections 2 and 3).
2. HAWK is described, a hardware accelerator design with a fixed scan-and-select processing rate. HAWK employs automata sharding to break the user's query across many parallel processing elements. The design is orthogonal to standard data sharding (i.e., breaking the dataset into independent parts for parallel processing), and can be combined with that approach if desired (Sections 4 and 5).
3. There is demonstrated, using simulation, hardware synthesis, and real-world software tests, that HAWK can saturate modern memory bandwidths, and can obtain processing rates that are orders of magnitude faster than standard in-memory databases and tools. Indeed, the scan operations are fast enough that they are often competitive with software solutions that utilize pre-computed indexes. HAWK's hardware requirements are modest enough to be implementable given the resources on a server-class chip (Section 6).

Problem Description

This example disclosure focuses on the single problem of fast in-memory scans of textual and log-style data, a crucial task for a range of data management tools, including in-memory relational databases performing in-situ data processing, log processing tools such as Splunk [3], file-centric command-line tools such as grep, awk, and visualization programs. FIG. 6 shows a brief example of such data.

Of particular interest are settings where log data arrive quickly and should be queried rapidly. Examples of such workloads include analytics for network security, de-bugging and performance analysis of distributed applications, online advertising clickstreams, financial trading applications, and multiplayer online games. More speculative applications could include news discovery and trend analysis from Twitter or other online text sources. The query workload is a mixture of standing queries that can be pre-compiled and ad hoc ones that are driven by humans or by automated responses to previous query results.

In this section, the disclosure covers the user-facing desiderata of such a system, including the data model and query language. Then, the disclosure considers traditional software solutions for such queries and why hardware acceleration is desirable.

Desiderata for a Log Processing System

The disclosure now briefly describes the types of data and queries that the system aims to manage.

Data Characteristics—the text to be queried is log-style information derived from Web servers or other log output from server-style software. Imagine a single textual dataset that represents a set of records, each consisting of a number of fields. Delimiters specify the end of each record and each field; the number of fields per record is variable. Because the text arrives very rapidly in response to external system activity, there is no premade indexing structure (e.g., a B+Tree) available. The logs are append-style, so the records are sorted by arrival time.

Query Language—the data processing system should answer selection and projection queries over the aforementioned data. Fields are simply referred to by their field number. For example, for the data in FIG. 6, a user might want to ask:
SELECT $3, $5 WHERE $7=200 AND
  ($5="132.199.200.201" OR $5="100.202.444.1")
The system uses default field and record delimiters, but the user can specify them explicitly if needed:
SELECT $3, $5 WHERE $7=200 AND
  ($5="132.199.200.201" OR $5="100.202.444.1")
  FIELD_DELIM='/'
  RECORD_DELIM=';'
The system should support boolean predicates on numeric fields (=, <>, >, <, <=, =<) and textual ones (equality and LIKE).

Query Workload—The disclosure assumes queries that have four salient characteristics. First, they are ad hoc, possibly written in response to ongoing shifts in the incoming log data, such as in financial trading, social media intelligence, or network log analysis. This changing workload means that even if there were the time to create an index in advance, it would not be clear as to which indexes to construct.

Second, queries are time-sensitive: the user expects an answer as soon as possible, perhaps so the user can exploit the quick-moving logged phenomenon that caused them to write the query in the first place. This need for fast answers further undermines the case for an index: the user cannot wait for the upfront indexing cost.

Third, queries are highly selective: the vast majority of the log data will be irrelevant to the user. The user is primarily interested in a small number of very relevant rows in the log. As a result, although the system offers projections, it is not designed primarily for the large aggregations that motivate columnar storage systems.

Fourth, queries may entail many equality tests: it is believed that when querying logs, it will be especially useful for query authors to test a field against a large number of constants. For example, imagine the user wants to see all log entries from a list of suspicious users:
SELECT $1, $2, $3 WHERE $3='user1'
  OR $3='user2' OR $3='user3' OR . . .
Or imagine a website administrator wants to examine latency statistics from a handful of "problem URLs":
SELECT $1, $4, WHERE $1='/foo.html'
  OR $3='/bar.html' OR . . .
If it is assumed that the list of string constants—the set of user-names or the set of problematic URLs—is derived from a relation, these queries can be thought of as implementing a semi join between a column of data in the log and a notional relation from elsewhere [10]. This use case is so common that the system has explicit support for it in both the query language and the execution runtime. For example, the user can thus more compactly write:
SELECT $1, $4 WHERE $4={"problemurls.txt" }
for a query logically equivalent to the one above.

When integrating HAWK with the software stack and interacting with the user, the disclosure envisions at least two possible scenarios. The first usage scenario involves close integration with a data management tool. When the database engine encounters an ad hoc query, the query is handed off to the accelerator for processing, potentially freeing up the server cores for other processing tasks. Once the accelerator has completed execution, it returns pointers in memory to the concrete results. The database then retakes control and examines the results either for further processing (such as aggregation) or to return to the user. This scenario can be generalized to include non-database text processing soft-ware, such as grep and awk.

The second usage scenario involves a stand-alone deployment, in which a user submits queries directly to the accelerator (via a minimal systems software interface) and the accelerator returns responses directly to the user. In either case, the RDBMS software and the user cannot interact entirely directly with the hardware. Rather, they use the hardware-specific query compiler we describe in Section 5.1.

Conventional Solutions

Today, scan operations like the disclosure considers are typically processed entirely in software. Simple text processing is often performed with command-line tools like grep and awk, while more complex scan predicates are more efficiently processed in column-store relational databases, such as Monet D B [17] and Vertica [15]. Keyword search is typically performed using specialized tools with pre-computed indexes, such as Lucene [18] or the Yahoo S4 framework [21]. However, software-implemented scans fall well short of the theoretical peak memory bandwidth available on modern hardware because scan algorithms execute numerous instructions (typically tens, and sometimes hundreds) per byte scanned. Furthermore, conventional text scanning algorithms require large state transition table data structures that cause many cache misses. For the present design goal of 32 GC/s, and a target accelerator clock frequency of 1 Giga-hertz, our system processes 32 characters each clock cycle. Given a conventional core's typical processing rates of at most a few instructions per cycle, and many stalls due to cache misses, a system would potentially require hundreds of cores to reach the present desired level of performance.

Indexes are clearly effective, but are also time-consuming and burdensome to compute. Traditional index generation is prohibitive for time-sensitive, ad hoc queries. Moreover, indexes rapidly become stale for high-velocity sources and are expensive to update.

Hardware-based solutions have been marketed for related applications, for example, IBM Netezza's data analytics appliances, which make use of FPGAs alongside traditional compute cores to speed up data analytics [13]. The present accelerator design could be deployed on such an integrated FPGA system. Some data management systems have turned to graphics processing units (GPUs) to accelerate scans. However, prior work has shown that GPUs are ill-suited for string matching problems [36], as these algorithms do not map well to the single instruction multiple thread (SIMT) parallelism offered by GPUs. Rather than rely on SIMT parallelism, the present accelerator, instead, is designed to efficiently implement the finite state automata that underlie text scans; in particular, the present accelerator incurs no stalls and avoids cache misses.

In short, existing software and hardware solutions are unlikely to reach the present goal of fully saturating memory bandwidths during scan—the most promising extant solution is perhaps the FPGA-driven technique. Therefore, the main topic of this disclosure is how to use dedicated hardware to support the aforementioned query language at our target processing rate.

Background

This disclosure briefly describes the classical algorithm for scanning text corpora, on which HAWK is based. The Aho-Corasick algorithm [4] is a widely used approach for scanning a text corpus for multiple search terms or patterns (denoted by the set S). Its asymptotic running time is linear in the sum of the searched text and pattern lengths. The algorithm encodes all the search patterns in a finite automaton that consumes the input text one character at a time.

The Aho-Corasick automaton M is a 5-tuple (Q, α, δ, q0, A) comprising:

1. A finite set of states Q: Each state q in the automaton represents the longest prefix of patterns that match the recently consumed input characters.
2. A finite alphabet α
3. A transition function (δ: Q×α→Q): The automaton's transition matrix comprises two sets of edges, which, together, are closed over α. The goto function $g(q, α_i)$ encodes transition edges from state q for in-put characters $α_i$, thereby extending the length of the matching prefix. These edges form a trie (prefix tree) of all patterns accepted by the automaton. The failure function f (q, ⊣i) encodes transition edges for input characters that do not extend a match.
4. A start state q0 2 Q, or the root node.
5. A set of accepting states A: A state is accepting if it consumes the last character of a pattern. An output function output(q) associates matching patterns with every state q. Note that an accepting state may emit multiple matches if several patterns share a common suffix.

FIG. 7 shows an example of an Aho-Corasick trie for the patterns 'he', 'she', 'his' and 'hers' (failure edges are not shown for simplicity).

Two challenges arise when seeking to use classical Aho-Corasick automata to meet our performance objective: (1) achieving deterministic lookup time, and (2) consuming input fast enough. To aid in our description of these challenges, we leverage the notation in Table 1.

TABLE 1

Notation.

| Parameter | Symbol |
| --- | --- |
| Alphabet | α |
| Set of search patterns | S |
| Set of states in pattern matching automaton | Q |
| Characters evaluated per cycle (accelerator width) | W |

Deterministic lookup time—a key challenge in implementing Aho-Corasick automata lies in the representation of the state transition functions, as various representations trade off space for time.

The transition functions can be compactly represented using various tree data structures, resulting in lookup time logarithmic in the number of edges that do not point to the root node (which do not need to be explicitly represented). Alternatively, the entire transition matrix can be encoded in a hash table, achieving amortized constant lookup time with a roughly constant space overhead relative to the most compact tree.

However, recall that the present objective is to process input characters at a constant rate, without any possibility of stalls in the hardware pipeline. This requires deterministic time per state transition to allow multiple automata to operate in lockstep on the same input stream. (As will become clear later, operating multiple automata in lockstep on the same input is central to the present design). Hence, neither logarithmic nor amortized constant transition time are sufficient.

Deterministic transition time is easily achieved if the transition function for each state is fully enumerated as a lookup table, provided the resulting lookup table is small enough to be accessed with constant latency (e.g., by loading it into an on-chip scratchpad memory). However, this representation results in an explosion in the space requirement for the machine: the required memory grows with $O(|\alpha| \cdot |Q| \cdot \log(|Q|))$. This storage requirement rapidly outstrips what is feasible in dedicated on-chip storage. Storing transition tables in cacheable memory, as in a software implementation, again leads to non-deterministic access time.

Consuming multiple characters—A second challenge arises in consuming input characters fast enough to match the present design target of 32 GC/s. If only one character is processed per state transition, then the automaton processes state transitions at 32 GHz. However, there is no feasible memory structure that can be randomly accessed to determine the next state at this rate.

Instead, in this embodiment, the automaton consumes multiple characters in a single transition. The automaton can be reformulated to consume the input W characters at a time, resulting in an input alphabet size of $|\alpha|^W$. However, this larger alphabet size leads to intractable hardware—storage requirements grow due to an increase in the number of outgoing transitions per state on the order of $O(|\alpha|^W \cdot \log|Q|)$. Moreover, the automaton still accepts patterns that are arbitrarily aligned with respect to the window of W bytes consumed in each transition. Accordingly for these alignments leads to $|Q|=O(|S| \cdot W)$ states. Hence, storage scales exponentially with W as $O(|S| \cdot W|\alpha|^W \log_2(|S|W))$.

HAWK uses a representation of Aho-Corasick automata that addresses the aforementioned challenges. In the next section, there is discussed the principle of HAWK's operation, and detail of the corresponding hardware design.

Hawk in Principle

The disclosure now describes the proposed system for processing text log queries at rates that meet or exceed memory bandwidth. First are described the central ideas that underlie the HAWK architecture. Then are described the architecture at a high-level before describing its core components: the query compiler, the pattern automaton units, the intermediate match unit, and the field alignment unit.

Preliminaries

Recall that this disclosure proposes a fixed scan rate system meaning that the amount of input processed is the same for each clock cycle: HAWK has no pipeline stalls or other variable-time operations. Since semiconductor manufacturing technology will limit the clock frequency (the system targets a 1 GHz clock), a way to obtain arbitrary scanning capacity with the present design is to increase the number of characters that can be processed at each clock cycle.

There are multiple possible deployment settings for the architecture: integrating into existing server systems as an on-chip accelerator (line integrated GPUs), or as a plug-in replacement for a CPU chip, or "programmed" into reconfigurable logic in a CPU-FPGA hybrid [7]. The most appropriate packaging depends on workload and manufacturing technology details that are outside the scope of this paper.

An accelerator instance is a sub-system of on-chip components that process a compiled query on a single text stream. It is possible to build a system comprising multiple accelerator instances to scale processing capability. Herein an accelerator instance's width W is considered as the number of characters processed per cycle. An accelerator instance that processes one character per cycle is called 1-wide, and an instance that processes 32 characters per cycle is called 32-wide. Thus, if the design target is 32 GB/s of scanning capacity, and the clock has a 1 GHz frequency, the system could deploy either a single 32-wide accelerator instance, or 32 1-wide accelerator instances. When deploying HAWK, an architect decides how many accelerator instances should be manufactured, and of what width.

A common technique in data management systems is data sharding, in which the target data (in this case, the log text we want to query) is split over many processing elements and processed in parallel. The present architecture allows for data sharding—in which each accelerator instance independently processes a separate shard of the log text, sharing available memory bandwidth—but it is not the primary contribution of the disclosure. More interestingly, the architecture enables automata sharding, in which the user's query is split over multiple accelerator instances processing a single input text stream in lockstep. Automata sharding enables HAWK to process queries of increasing complexity (i.e., increasing numbers of distinct search patterns) despite fixed hardware resources in each accelerator instance. HAWK is designed to make automata sharding possible.

Key Idea

A key idea that enables HAWK to achieve wide, fixed-rate scanning is the reformulation of the classic Aho-Corasick automaton to process W characters per step with tractable storage. As previously explained, simply increasing the input alphabet to $|\alpha|W$ rapidly leads to intractable automata.

Instead, the system extends the concept of bit-split pattern matching automata [30] to reduce total storage requirements and partition large automata across multiple, small hardware units. Tan and Sherwood propose splitting a byte-based ($|\alpha|=2^8=256$) Aho-Corasick automaton into a vector of eight automata that each process a single bit of the input character. Each state in the original automaton thus corresponds to a vector of states in the bit-split automata. Similarly, each bit-split state maps to a set of patterns accepted in that state. When all eight automata accept the same pattern, a match is emitted.

Bit-split automata conserve storage in three ways. First, the number of transitions per state is reduced to 2, making it easier to store the transition matrix in a lookup table. Second, reduced fan-out from each state and skew in the input alphabet (i.e., ASCII text has little variation in high-order bit positions) results in increased prefix overlap. Third, the transition function of each automaton is distinct. Hence, the automata can be partitioned in separate storage and state IDs can be reused across automata, reducing the number of bits required to distinguish states.

A contribution of the present system is to extend the bit-split automata to process W characters per step. Instead of eight automata, the formulation requires W×8 automata to process W characters per step. The number of states in a single-bit machine is bounded in the length of the longest search term $L_{max}$. Since the automaton is a binary tree, the total number of nodes cannot exceed $2^{L_{max}+1}-1$. A key observation is that the length of the longest search pattern is divided by W, so each bit-split state machine sees a pattern no longer than $$\frac{L\max}{W} + P,$$

with P being at most two characters added for alignment of the search term in the W-character window. |Q| for a single bit machine scales as $$O(2)\left[\frac{L\max}{W} + P + 1\right] = O(1)$$

in W. The storage in the bit-split state machines grows as $O(|S|W)$ to overcome the aforementioned alignment issue (reasons for this storage increase will become clear in subsequent sections). With W×8 bit-split machines, the total storage scales as $O(8 \cdot |S| \cdot W 2)$, thereby effecting exponential storage savings compared to the byte-based automaton.

Design Overview

FIG. 8 shows a high-level block diagram of an accelerator design. At query time, the system compiles the user's query and sends the compiled query description to each accelerator instance. Each instance then scans the in-memory text log as a stream, constantly outputting data that should be sent to higher-level software components for further processing (say, to display on the screen or to add to an aggregate computation).

Major components of the design are:

- A compiler that transforms the user's query into a form the hardware expects for query processing. Specifically, it generates a set of bit-split pattern matching automata for loading into the accelerator. These automata reflect the predicates in the user's query.
- Pattern automaton hardware units that maintain and advance the bit-split automata. At each cycle, each pattern automaton unit consumes a single bit of in-memory text input. Because each automaton consumes only one bit at a time, it cannot tell by itself whether a pattern has matched. After consuming a bit, each automaton emits a partial match vector (PMV) representing the set of patterns that might have matched, based on the bit and the automaton's current state. For an accelerator instance of width W, there are W×8 pattern automaton units. For a query of |S| patterns, the partial match vector requires |S|×W bits.
- The intermediate match hardware unit consumes PMVs from the pattern automata processing each bit position to determine their intersection. At each clock cycle, the intermediate match unit consumes W×8 PMVs, performing a logical AND operation over the bit-vectors to produce a single intermediate match vector (IMV) output. The IMV is the same length as the PMVs: |S|×W.
- Finally, the field alignment unit determines the field within which each match indicated by the IMV is located. Pattern matching in all of the preceding steps takes place without regard to delimiter locations, and therefore, of fields and records in the input log file. This after-the-fact mapping of match locations to fields, which is a novel feature of the design, allows the system to avoid testing on field identity during pattern matching, and thereby avoids the conditionals and branch behavior that would undermine the fixed-rate scan design. If the field alignment unit finds that the IMV indicates a match for a field number that the user's query requested, then it returns the resulting final match vector (FMV) to the database software for post-processing. To simplify the design, the system caps the number of fields allowed in any record to 32—a number sufficient for most real-world log datasets.

Note that each accelerator instance supports searching for 128 distinct patterns. Therefore, the 32×1 configuration can process up to 32×128 patterns, the 16×2 configuration can process up to 16×128 distinct patterns, and the 1×32 configuration can process up to 1×128 distinct patterns. By varying the number of instances and their width, the designer can trade off pattern constraints, per-stream processing rate, and, as we shall see later, area and power requirements (see Section 6.3).

Hawk Architecture

There are now described the four elements of HAWK highlighted in FIG. 8 in detail.

Compiler

HAWK first compiles the user's query into pattern-matching automata. As mentioned previously, the system applies the concept of bit-split pattern matching automata [30] to shrink the total number of transition rules stored in each accelerator instance; otherwise, naively storing transition tables on chip would be prohibitive.

FIG. 9 conceptually depicts compilation for a 4-wide accelerator. Algorithm 1 provides details of the compilation algorithm. The compiler's input is a query in the form described above. After parsing the query, the compiler determines the set of all patterns S, which is the union of the patterns sought across all fields in the WHERE clause. S is sorted lexicographically and then sharded across accelerator instances (Line 1). Sharding S lexicographically maximizes prefix sharing within each bit-split automaton, reducing their sizes.

Next, the compiler transforms S to account for all possible alignments of each pattern within the W-character window processed each cycle. The compiler forms a new set S0 wherein each pattern in S is padded on the front and back with "don't care" characters to a length that is a multiple of W, forming W patterns for all possible alignments with respect to the W-character window (Lines 2-7). FIG. 9 shows an example of this padding for S={bit, byte, nibble} and W=4. For a one-wide machine, no padding is required. The compiler then generates bit-split automata for the padded search patterns in S0. We generate these bit-split automata according to the algorithm proposed by Tan and Sherwood [30](summarized in Lines 9-16). A total of W×8 such automata are generated, one per input stream bit processed each cycle. Each state in these automata has only two outgoing edges, hence, the transition matrix is easy to represent in hardware. Automata are encoded as transition tables indexed by the state number. Each entry is a 3-tuple comprising the next state for inputs bits of zero and one and the PMV for the state. Each state's PMV represents the set of padded patterns in S' that are accepted by that automaton in that state. The compiler assigns each pattern a distinct bit position in the PMV (Line 21). The bit position corresponds to the pattern's end-location within the W-character input window as follows. The first S bits of the PMV are associated with the alignment where the last character of each search pattern is the first character in the W-character window. The second set of S bits corresponds to the next alignment which ends in the second character, and so on. Recall that as each pattern is padded W times, the alignments enumerate all end locations for the pattern within the W-character window. This assignment of bit positions for each padded pattern is used to resolve the precise location of the unpadded pattern during field matching (see below). It is important to note that the hardware does not store S0 directly. Rather, patterns are represented solely as bits in the PMV.

Pattern Automata

The pattern automata, shown in the first panel of FIG. 10, each process a single bit-split automaton. Each cycle, they each consume one bit from the input stream, determine the next state, and output one PMV indicating possible matches at that bit position.

Consider the pattern automaton responsible for bit 0 of the W×8-bit input stream (from FIG. 10). In cycle 0, the automaton's current state is 0. The combination of the current state and the incoming bit value indicates a lookup table entry; in this case, the incoming bit value is 0, so the lookup table indicates a next state of 1. The pattern automaton advances to this state and emits its associated PMV to the intermediate match unit for processing in the next cycle.

The transition table and PMV associated with each state are held in dedicated on-chip storage. The system uses dedicated storage to ensure each pattern automaton can determine its next state and output PMV in constant time. (Accesses may be pipelined over several clock cycles, but, the present implementation requires only a single cycle at 1 GHz frequency.).

Storage requirements for pattern automata may be determined empirically, e.g. select 128 search terms at random from an English dictionary and observe the number of states generated per automaton, round the maximum number of states required by any automaton to the next power of 2, and provision this storage for all automata.

TABLE 2

Provisioned storage - per bit-split state machine, and total.

| Accelerator Width (W) | 1 | 2 | 4 | 8 | 16 | 32 |
|---|---|---|---|---|---|---|
| Per Bit-split Machine Storage (KB) | 74.8 | 69.6 | 33.5 | 16.5 | 16.4 | 32.8 |
| Total Storage (MB) | 0.6 | 1.11 | 1.07 | 1.06 | 2.1 | 8.4 |

Table 2 shows the per-automaton and total storage allocation for a range of accelerator widths. The storage requirement per pattern automaton is comparable to a first-level data cache of a conventional CPU. We observe a few interesting trends. First, the per-automaton-storage is minimal for W=8 and W=16. Whereas the number of patterns grows with W (a consequence of our padding scheme), the number of states in each automaton shrinks due to an effective reduction in pattern length (a consequence of processing multiple characters simultaneously). At the same time, as the number of patterns grows, the PMV width increases. The reduction in states dominates the larger PMV widths until W=16. Beyond that point, the impact of increased PMV widths starts to dominate.

Note that the system conservatively provisions the same storage for all automata, despite the fact that ASCII is highly skewed and results in far more prefix sharing in high-order bit positions. This decision allows our accelerator to support non-ASCII representations and ensures symmetry in the hardware, which facilitates layout.

Intermediate Match Unit

The intermediate match unit (the middle panel of FIG. 10) calculates the intersection of the PMVs. A pattern is present at a particular location in the input stream only if it is reported in the PMVs of all pattern automata. The intermediate match unit is a wide and deep network of AND gates that computes the conjunction of the W×8|S|×W-bit PMVs. The result of this operation is the |S|×W-bit wide intermediate match vector, which is sent to the next processing stage. As with the pattern automata, the intermediate match unit's execution can be pipelined over an arbitrary number of clock cycles without impacting the throughput of the accelerator instance, but our 32-wide implementation requires only a single cycle.

FIG. 10 shows that the PMVs generated by the pattern automata in cycle 0 are visible to the intermediate match unit in cycle 1. The intermediate match unit performs a bitwise AND operation on all W×8|S|×W-bit PMVs and yields an IMV. In our example, the second and last bits of all PMVs are set; indicating that the padded patterns corresponding to these entries have been matched by all bit-split state machines: true matches. The intermediate match unit, therefore, outputs an IMV with these bits set as well.

Field Alignment Unit

HAWK's operation so far has ignored the locations of matches between the log text and the user's query; it can detect a match, but cannot tell whether the match is in the correct tuple field. The field alignment unit (the bottom panel of FIG. 10) reconstructs the association between pattern matches and fields. The output of the field alignment unit is an array of field match vectors (FMVs), one per field. Each vector has a bit per padded search pattern (|S|×W bits), which allow the user to determine the exact location of the matching pattern within the input stream. Bit i in FMVj indicates whether pattern i matched field j and the pattern's location within the input stream.

The field alignment unit receives two inputs. The first input is the |S|×W-bit IMV output from the intermediate match unit. This vector represents the patterns identified as true matches.

The second input comes from a specialized delimiter detector that is preloaded with user-specified delimiter characters. (The hardware design for the delimiter detector is straight-forward and is not detailed here for brevity). Each cycle, the delimiter detector emits a field ID for every character in the W-character window corresponding to the current IMV (overall, W field IDs).

Search patterns that end at a particular character location belong to the field indicated by the delimiter detector. Recall that bit positions in the PMVs (and hence, the IMV) identify the end-location of each padded search pattern within the current W-character window (see above). Thus for every end-location, the field alignment unit maps corresponding IMV bits to the correct field ID, and the respective FMV. The operation of the field alignment unit is a demultiplexing operation (see FIG. 10).

In cycle 2, the field alignment unit evaluates the window processed by the pattern automata in cycle 0 and by the intermediate match unit in cycle 1. In our example, the IMV's second and last bits are set, indicating that the corresponding patterns ending at character0 and characterw-1 have matched in some fields. The delimiter detector indicates that character0 is in field0, and character-1 is in field1. Thus, the patterns ending at character0 are mapped to the FMV for field0, and the patterns ending at characterw-1 are mapped to the FMV for field1. The mapped FMVs are subsequently sent to the post-processing software.

The field alignment unit hardware entails 32 AND operations for each bit of the IMV. Compared to the pattern matching automata, the area and power overheads are negligible.

Experimental Results

Three metrics of success can be used when evaluating HAWK. The most straightforward is query processing performance

TABLE 3

Server specifications.

| | |
|---|---|
| Chip | Intel E5630, 16-cores @ 2.53 GHz |
| Caches | 256 KB L1, 1 MB L2, 12 MB L3 |
| Memory Capacity | 128 GB |
| Memory Type | Dual-channel DDR3-800 |
| Max. Mem. Bandwidth | 12.8 GB/s | when compared to conventional solutions on a modern server. The remaining metrics describe HAWK's area and power requirements, the two hardware resource constraints that matter most to chip designers. We will show that when given hardware resources that are a fraction of those used by a Xeon chip, HAWK can reach its goal of 32 GC/s and can comfortably beat conventional query processing times, sometimes by multiple orders of magnitude.

Experimental Setup

HAWK's performance can be compared against four traditional text querying tools: awk, grep, MonetDB [17], and Lucene [18]. All conventional software is run on a Xeon-class server, with specs described in Table 3. Datasets are preloaded into memory, running an initial throwaway experiment to ensure data is hot. All experiments are repeated five times and report average performance.

HAWK is implemented in the Verilog hardware description language. An ASIC design is synthesized using Synopsys' DesignWare IP suite [29], which includes tools that give timing, area, and power estimates. (Synthesis estimates of area and power from such tools are part of conventional practice when testing novel hardware designs.)

Synthesizing an ASIC design entails choosing a target manufacturing technology for the device. The present example system targets a commercial 45 nm manufacturing technology with a nominal operating voltage of 0.72 V, and design for a clock frequency of 1 GHz. This technology is somewhat out of date; it is two generations behind the manufacturing technology used in the state-of-the-art Xeon chip for our conventional software performance measurements. Since power and area scale with the manufacturing technology, this discussion compares HAWK's power and area against a prior-generation Intel processor manufactured in the same technology.

The HAWK compiler is written in C. For the large memory-resident datasets expected to be processed, query compilation time is negligible relative to the runtime. Since the primary focus of this example system is on string pattern matching, the compiler software does not currently handle numeric fields automatically; numeric queries are combined by hand. However, extending the compiler to handle numeric predicates is straightforward.

The evaluation considers three example use cases for HAWK that stress various aspects of its functionality. In each case, a comparison is made to the relevant software alternatives.

Single Pattern Search

First consider the simplest possible task: a scan through the input text for a single, fixed string. A synthetic 64 GB dataset comprising 100-byte lines is generated. The text log synthesis method described by Pavlo et al., for a similar experiment [23] is used. The synthetic data is formulated to include target strings that match a notional user query with selectivities of 10%, 1%, 0.1%, 0.01%, and 0.001%. The queries for searching for each of these strings and report matching lines are timed. HAWK is compared against a relational column-store database (MonetDB) and the UNIX grep tool. For MonetDB, the data is loaded into the database prior to query execution.

Multiple Pattern Search

Next, consider a semijoin-like task, wherein HAWK searches for multiple patterns in a real-world dataset, namely, the Wikipedia data dump (49 GB). Select patterns at random from an English dictionary; vary their number from one to 128. Compare against an inverted text index query processor (Lucene) and again grep. For Lucene, create the inverted index prior to query execution; indexing time is not included in the performance comparison. Lucene and grep handle certain small tokenization issues differently; to ensure they yield exactly the same search results, make some small formatting changes to the input Wikipedia text. Execute grep with the -Fw option, which optimizes its execution for patterns that contain no wildcards.

Complex Predicates

Finally, consider queries on a webserver-like log of the form <Source IP, Destination URL, Date, Ad Revenue, User Agent, Country, Language, Search Word, and Duration>. This dataset is also based on a format proposed by Pavlo and co-authors [23]. A complex query has selection criteria for multiple columns in the log. It takes the following form (add the COUNT element to the query so that MonetDB incurs only trivial aggregation costs and no materialization costs):

SELECT COUNT (*) FROM dataset WHERE ((Date in specified range)
AND (Ad Revenue within range)
AND (User Agent LIKE value2 OR User Agent LIKE . . . ) AND (Country LIKE value4 OR Country LIKE . . . )
AND (Language LIKE value6 OR Language LIKE . . . )
AND (Search Word LIKE value8 OR Search Word LIKE . . . ) AND (Duration within range)).

Tune the various query parameters to achieve selectivities of 10%, 1%, 0.1%, 0.01%, and 0.001%. Compare against equivalent queries executed with the relational column-store (MonetDB) and the UNIX tool awk.

Performance

The following contrasts the performance of HAWK to various soft-ware tools in GC/s. By design. HAWK achieves a performance of 32 GC/s, and there is no sensitivity to query selectivity or the number of patterns (provided the query fits within the available automaton state and PMV capacity). In contrast, the software tools show sensitivity to both these parameters, so they are varied in the experiments.

Single Pattern Search

FIG. 11 compares HAWK's single pattern search performance against MonetDB and grep. It is found that HAWK's constant 32 GC/s performance is over an order of magnitude better than either software tool, and neither comes close to saturating memory bandwidth. MonetDB's performance suffers somewhat when selectivity is high (above 1%), but neither grep nor MonetDB exhibit much sensitivity at lower selectivities.

Multiple Pattern Search

FIG. 12 compares HAWK against Lucene and grep when searching for multiple randomly-chosen words in the Wikipedia dataset. For Lucene, query formulations are explored that search for multiple patterns in a single query or execute separate queries in parallel and report the best result.

Grep's performance is poor: its already poor performance for single-pattern search (1 GC/s) drops precipitously as the number of patterns increases, to as little as 20 megacharacters/s in the 128-word case. Unsurprisingly, because it uses an index and does not actually scan the input text, Lucene provides the highest performance. Its performance is reported by dividing query execution time by the size of the data set to obtain an equivalent GC/s scan rate. Note that this equivalent scan rate exceeds available memory bandwidth in many cases (i.e., no scan-based approach can reach this performance).

The results show that, when the number of patterns is large, HAWK is competitive with Lucene even though HAWK does not have access to a pre-computed inverted index. In the 128-pattern case, Lucene's performance of 30.4 GC/s falls short of the 32 GC/s performance of HAWK. At best, Lucene outperforms HAWK by a factor of two for this data set size (its advantage may grow for larger data sets, since HAWK's runtime is linear in the dataset size). Of course, these measurements do not include the 30 minutes of pre-query processing time that Lucene requires to build the index. (As a point of comparison, our automata compile times are on the order of seconds.) As a result, even though Lucene's query processing times are faster when the set of patterns is small, HAWK is a better fit in our target ad hoc scenario, in which the text corpus is changing rapidly enough to make indexing impractical.

Complex Predicates

FIG. 13 compares HAWK, MonetDB, and awk on the complex queries described above. MonetDB performance spans a 45× range as selectivity changes from 10% to 0.001%. When selectivity is low, MonetDB can order the evaluation of the query predicates to rapidly rule out most tuples, avoiding the need to access most data in the database. For 0.001% selectivity, it outperforms HAWK by 3×. However, for less selective queries, where MonetDB scans large text fields in most tuples, HAWK provides superior performance, with more than 10×advantage at 100% selectivity. The performance of awk is not competitive.

Area and Power

TABLE 4

Component area and power needs for 1-wide and 32-wide configurations.

| | 1-wide | | 32-wide | |
|---|---|---|---|---|
| Unit | Area (mm$^2$) | Power (mW) | Area (mm$^2$) | Power (mW) |
| Pattern Automata | 5.7 | 2602 | 86 | 44,563 |
| Intermediate Match Unit | <0.1 | <1 | <1 | 35 |
| Field Alignment Unit | <1 | 14 | 1 | 448 |
| Delimiter Detector | 1.1 | <1 | <1 | <1 |
| Numeric Units | <0.1 | 1 | <1 | 39 |
| Other Control Logic | 0.2 | 26 | 1 | 146 |
| Total | 7.1 | 2644 | 89 | 45,231 |

A breakdown of a HAWK instance's per-sub-component area and power estimates for two extreme design points, 1-wide and 32-wide is given in Table 4. For both designs, the pattern automata account for the vast majority of area and power consumption. Pattern automata area and power are dominated by the large storage structures required for the state transition matrix and PMVs2. The pattern automata storage is synthesized with large arrays of flip-flops. Area and power are expected to be reduced by up to a factor of two if the design were to use register files instead. The impact that state machine size has on the implementation can be seen. Even with the drastic savings afforded by the bit-split technique, the automata storage requirements are still large; without the technique, they would render the accelerator impractical. FIGS. 14 and 15 compare the area and power requirements of HAWK to an Intel Xeon W5590 chip [2]. That chip uses the same generation of 45 nm manufacturing technology as our synthesized design. A 1-wide HAWK instance is found to require only 3% of the area and 2% of the power of the Xeon chip. A 32-wide HAWK requires 42% of the area and 35% of the power of the Xeon processor. Although these values are high, they would improve when using more modern manufacturing technology; a 32-wide HAWK instance might occupy roughly one-sixth the area of a modern server-class chip.

FIGS. 14 and 15 also reveal an interesting trend. The 8-wide (4×8) and 16-wide (2×16) HAWK configurations utilize resources more efficiently (better performance per area or Watt) than other configurations. This saddle point arises due to two opposing trends. Initially, as width W increases from 1, the maximum padded pattern length (Lmax) per bit-split automaton decreases rapidly. Since each bit-split automaton is a binary tree, lower Lmax yields a shallower tree (i.e., fewer states) with more prefix sharing across patterns. Overall, the reduced number of states translates into reduced storage costs.

However, as W continues to grow, Lmax saturates at a minimum while the set of padded patterns, S0, grows proportionally to |S|×W. Each pattern requires a distinct bit in the PMV, which increases the storage cost per state. Above W=16, the increased area and power requirements of the wide match vectors outweigh the savings from reduced Lmax, and total resource requirements increase.

Overall, the 8-wide and 16-wide configurations strike the best balance between these opposing phenomena. It is more efficient to replace one 32-wide accelerator with four 8-wide accelerators or two 16-wide accelerators. The 4×8 configuration, which exhibits the lowest area and power costs, is found to require approximately 0.5× area and 0.48× power compared to the 32-wide accelerator, while maintaining the same performance. Compared to the W5590, the 4×8 configuration occupies about 0.21 the area and requires 0.17× the power. From a deployment perspective, using four 8-wide accelerators (4×8) is recommended to obtain an advantageous performance-efficiency trade-off.

Conclusion

High-velocity text log data have undergone explosive growth in recent years. Data management systems that rely on index-driven approaches cannot apply to this workload, and conventional scan-based mechanisms do not come close to exploiting the full capacity of modern hardware architectures. The HAWK accelerator can process data at a constant rate of 32 GB/s. HAWK is often better than state-of-the-art software solutions for text processing.

A further example embodiment will now be described below with reference to FIGS. 16 to 22.

The present example builds on the HAWK accelerator described above. HAWK facilitates scanning for fixed search patterns in an in-memory text corpus at rates matching the bandwidth of modern DRAM systems (e.g., 32 GB/sec). We refer to the present example as RegexHAWK and describe it relative to the original HAWK design.

HAWK supports exact string matches and the "." wildcard character. RegexHAWK extends HAWK with:
 The ability to support character classes, e.g., specified as ranges in a regular expression.
 The ability to support the Kleene Plus operator and bounded repetition operators.

These two hardware-supported capabilities can then be generalized to support alternation, optional, concatenation, and Kleene star operators via appropriate compilation of the input pattern.

Character classes. Character classes are supported by adding an additional stage to the HAWK pipeline prior to the existing pattern matching units. The key idea is to implement a boolean function that evaluates the predicate "Is this symbol in the character class?" for each symbol. Since the checks for each symbol are independent, W symbols can easily be checked in parallel. For ASCII, the predicate formula is efficiently implemented as a 256-bit lookup table, where a position is set to '1' if the corresponding ASCII character is in the class. For wider symbols (e.g., UNICODE), programmable comparators may be used for the common case of contiguous ranges in the symbol space. The output of these predicate formulas is then supplied as an additional bit to the bit-split state machines by provisioning an extra pattern match unit. When a character class should match at a given position, its "extra" bit-split input is set to match a '1' and all other bits are set to match both '1' and '0'. Additional character classes can be supported by provisioning additional bit-split matching machines up to some implementation limit.

Kleene plus and bounded repetition. We add support for Kleene plus (one or more repetitions of a string) and bounded repetition (fixed number of repetitions of a string) by extending the original HAWK design with several additional matching stages. Like HAWK, these stages are all designed to be stall-free and operate at a fixed scan rate as the input text is streamed from memory.

The challenge posed by the Kleene plus and similar regular expression operators is that they multiplicatively increase the ways in which portions of the pattern may be aligned with the window of W symbols scanned in single machine step. Recall that, for fixed-length search patterns, the HAWK compiler replaces a single pattern with W patterns padded with wildcard characters at the front and the back, forming the W possible alignments of the pattern with respect to the accelerator width. At each point where a regular expression pattern may vary in length (i.e., at all Kleene operators), a similar alignment problem arises, resulting in an explosion in the number of patterns.

We address this challenge by making the observation that run-length-encoding can transform variable-length matches of patterns containing a Kleene plus into a fixed-length, canonical form. That is, our key idea is to identify occurrences of the string operated on by the Kleene plus, count consecutive occurrences, and then replace these "runs" with a single occurrence and a count. After this transformation (which can be thought of as a data compression step), we then use a HAWK-like pipeline to search for exact matches of the canonical form, with explicit checks that the repetition count for each "run" falls in the range specified by the Kleene plus or bounded repetition operator (we defer for the moment handling the special case of zero repetitions for the Kleene star).

The RegexHAWK design applies this idea in three steps: (1) symbolic transformation, (2) run-length-encoding, and (3) pattern matching. The objective of symbolic transformation is to replace strings operated on by Kleene operators with a single symbol in an extended alphabet. Then, consecutive occurrences of this special symbol can be counted to perform the run-length-encoding compression. We use HAWK's existing capability for locating exact matches to find all these strings (called "components" in the narrative below). However, to ensure there is only one valid transformation that results in at most a single component match at any position in the input text, we impose the invariant that no component may be the suffix of any other component. FIG. 17 and the associated text details the pre-processing steps used to construct the components of a pattern while obeying this invariant. Components are found using a HAWK pipeline, replacing matching components with their corresponding symbol and then passing the transformed input to the coalescer.

The coalesce unit (run length encoder) scans the output stream of the component matching process and outputs a stream of (symbol, count) pairs, where the symbol is either an original symbol from the source alphabet or a special symbol representing a component. Count is the number of consecutive occurrences of the symbol. In this way, the coalescer transforms an input text with repeated strings into a canonical form, where all repetition has been replaced with counts.

Finally, a second HAWK pattern matching stage, or a second pass through the same HAWK pattern matching stage used to find the components, processes the output of the coalesce stage, again using bit-split automata to find matches of the original pattern, but using the extended alphabet where components have been replaced with their corresponding symbols. In lock-step, this HAWK stage matches the expected count of each symbol against upper and lower bounds as specified in the pattern. For exact matches, the bound specifies that the count is exactly 1. For the Kleene plus, the bound specifies that the count is greater than zero. For bounded repetitions, the bounds are explicitly specified. Each bit in the intermediate match vector (IMV) is set only if both the pattern and count match at the corresponding input position. The reduction operation across the IMVs proceeds as in the original HAWK design.

Details of each mechanism are described in the following sections.

1. Background 1.1 Aho-Corasick Algorithm

The Aho-Corasick algorithm [4] is widely used for locating fixed length patterns in text corpora. The algorithm enables this by constructing finite state pattern matching machines for the input patterns. First, it generates a prefix tree for all the patterns that are to be searched. The machine begins at a root node of a tree and advances to the following state when it processes a desired character. A match is found when all the characters in a pattern are processed successively and the output state is reached. However, on a mismatch, machine falls back over a failure transition to a prior state. A failure edge ensures that the machine can still begin from a state that can partially match another pattern even when the current match fails.

Aho-Corasick algorithm generates a prefix tree in time linear to the sum of lengths of input patterns and finds occurrences of patterns in time linear to the length of input text. Thus, it can match input characters continuously and ensure a constant runtime on an input string. However, the following limitations restrict the scalability of the algorithm:

Multi-character processing support—Aho-Corasick algorithm consumes a single character at a time, advances in the prefix tree, and generates a match if found. Several solutions explore ways to consume multiple characters per cycle by building multi-character tree. In such cases, automata is built to transition on multiple input characters. However, this approach is not a scalable since each state can generate $|\alpha|^W$ transitions, $\alpha$ being the alphabet size and W being the number of characters consumed per transition. The number of transitions rapidly scale with W making prefix tree generation a computationally expensive task. Moreover, the storage requirements of these transition in the hardware also make this technique impractical.

Possible number of transition states—Aho Corasick algorithm can potentially encode one transition per character of an alphabet for every state in a prefix tree. Thus, for an ASCII character encoding, this can result in 256 transitions per state leading to an impractical number of transitions in a prefix tree. Also, encoding these transitions in the hardware can entail high storage requirements and potentially larger memory lookup times. Since the number of transitions per state can vary, this can also lead to non-deterministic memory lookup times. Recall that our goal is to provide a constant rate of text processing without any stalling memory accesses. Hence, the automata generated by Aho Corasick algorithm cannot be mapped to our hardware since our goal is to ensure a constant processing throughput.

Regular expression matching—Aho-Corasick algorithm builds a prefix tree for fixed set patterns alone and does not support an arbitrary length regular expressions. Regular expressions involve transitions that are difficult to encode.

1.2 Our Approach

1.2.1 Tackling Number of State Transitions

As mentioned earlier, the number of transitions for each state in an automata generated by Aho-Corasick algorithm grows linearly with the size of the alphabet in the language. Moreover, the number of transitions increase manifold when an automata is generated to input multiple characters per cycle. In order to minimize the storage requirement incurred by these transitions, we leverage the concept of bitsplit pattern matching machines proposed by Tan and Sherwood [30]. The proposed technique generates an automata for the desired patterns using Aho-Corasick algorithm and then splits each character of a pattern into its ASCII equivalent eight bits. It transforms a prefix tree generated by Aho-Corasick algorithm into eight trees, each transitioning per ASCII bit of an input character. These eight bitsplit state machines update in parallel on an input character and generate potential matches in the form of a set of Pattern Matching Vectors (PMVs). A match is found when it is indicated as a potential match by all the generated PMVs. Since every bitsplit state machine consumes one bit of an input character, a state can transition to at the most two different states—for input bit 0 and 1. Consequently, a state machine originally generated using Aho-Corasick algorithm is split and stored as smaller state machines that are tractable in hardware.

However, the bitsplit machines can only be generated for fixed set patterns compiled using Aho-Corasick algorithm. We extend the concept proposed by Tan and Sherwood to enable processing of multiple characters per cycle to match regular expression patterns in an input text.

1.2.2 Multi-Character Per Step Matching

As the original bitsplit machine consumes only one character per step, it poses a limitation on the scanning bandwidth. We leverage the HAWK accelerator described above that enables multi-character processing for matching the patterns of fixed length. The proposed solution implements the bitsplit automata to process W characters per step and thus implements W×8 parallel bitsplit automata units. This further requires an alignment of patterns with respect to a W-character window processed per step which is ensured by generating W patterns, each pattern matching a particular position in a W-character window. We explain the technique in detail in Section 2.1.

1.2.3 Regular Expression Matching

Most of the software and hardware based solutions for matching regular expression today are based on deterministic finite automata (DFA) or non-deterministic finite automata (NFA). A major advantage of using DFA over NFA is a deterministic representation of the current state that automata is in and this determinism allows a simpler hardware implementation. However, with increase in the number of regular expression patterns, DFA suffers a state space explosion. The state space generated by DFA becomes intractable to be stored in on-chip memory.

On the contrary, Aho-Corasick algorithm can transform a fixed set patterns to generate the states that are bounded by the length of the longest string. We leverage this property of Aho-Corasick algorithm by splitting the regular expression patterns into components of finite length. Each of the components are then assigned unique symbolic ID in order to distinguish them.

The pattern automata of the accelerator identifies these components in the input string and the intermediate match unit combines PMVs from all the bitsplit machines to identify the components. In cases when accelerator compiles patterns of fixed length, output of intermediate match unit is further processed to find a match. However, while matching regular expressions, the intermediate match unit generates these matches in the form of W symbolic IDs for each of the components occurring at a particular position in a W-character window. These symbolic IDs are then processed through another pass of an accelerator so that distinct components can be combined to generate a final match of a regular expression pattern. A separate pass is enabled by reconfiguring part of the available lanes of bitsplit machines in the pattern automata unit to process the sequence of symbolic IDs. The lanes in the pattern automata unit are reconfigurable and they can be split amongst multiple passes for matching regular expressions at the cost of lower processing throughput.

Run length encoder, in the feedback path, merges consecutive recurring symbolic IDs of the components into a sequence of symbolic IDs and count of its number of consecutive occurrences in the input text. The set of these symbolic IDs and the respective count are of the fixed length and can processed through another pass of bitsplit machines. The second pass in pattern automata merges the components together to find the actual regex pattern. We further explain the technique we use to match the symbolic IDs by using multiple passes of the accelerator in Section 2.2.

2. Accelerator Architecture

FIG. 16 shows the architecture of our accelerator design. A compiler compiles the regular expression patterns, generates the state transitions for the bitsplit machines and stores the transition rules in the on-chip memories of the pattern automata unit. Since the bitsplit automata matches the patterns of fixed size, some pre-processing is necessary before compiling regular expression patterns into the automata. In order to process regular expressions, compiler splits the patterns into a simpler fixed length components. It then compiles these components into the bitsplit automata using a technique proposed by HAWK and stores these state machines in the pattern automata as shown in FIG. 16. The bitsplit machines in their original form do not support character classes due to optional set of characters that can match at a particular position. Hence, we implement a character class unit to detect whether an input character falls within the range of a compiled character class. As shown in FIG. 16, character class unit, in addition to the 8-bit ASCII input character, produces an extra k set of bits indicating the character class range matches.

The pattern automata processes W characters and the character class range matches per step and produces the potential matches in the form of partial match vectors (PMVs) for each of the compiled components. The intermediate match unit then combines the matches produced by each of the pattern automata to generate a final match for a component. The intermediate match unit can generate matches for |S| distinct components. The compiler ensures exclusivity of a match of a component at a particular location in a W-wide character window. Thus, no two components can match in a vector generated by the intermediate match unit at a given location assuring a set of W wide one-hot encoded matches. The one-hot encoded set is then converted to a set of W $\log_2$|S|-bit wide symbolic IDs by the encoder present in the null symbol eliminator.

The primary limitation of bitsplit machines is that they can only process patterns that are of fixed length. Owing to this, we process the repeating matches of the components to produce the set that is fixed in length. These components are then merged over another pass of the accelerator stage by reconfiguring the lanes of pattern automata stage. Run length encoder unit finds such recurring set of identical matches and converts them into a sequence of a component that matched at the location and the count of the number of the recurring matches of that component. Since regular expressions can require bounds on the number of recurring components, bound encoder unit encodes the counts generated by the run length encoder in a set of bits representing the counts. Pattern automata implements bitsplit state machines to match sequence of component matches and the counts. The potential matches generated by each unit are then merged by the intermediate match unit to obtain a final set of regular expression matches. We further discuss specifications of our compiler in Section 2.1 and hardware accelerator in Section 2.2 in detail.

2.1 Compiler 2.1.1 Splitting Regex Patterns

Compiler first splits input regex patterns into the components. The splitting is performed to match regex patterns partially in the first pass of our accelerator. The key idea behind splitting the patterns is to find the set of disjoint components i.e. no component is a suffix of another component. This ensures that no two patterns match simultaneously at a particular position in a W character window of the input text, thus enabling the run length encoder unit to find the consecutive recurrences of a component that are distinct. Let's consider a simple regular expression aaba+defg containing a Kleene Plus as illustrated in FIG. 17; compiler support for other regular expression quantifiers are explained later in the section. The steps performed to find a unique set of these components are elaborated in the following steps:

We first find the characters that are followed by the regex quantifiers in each of the input regex patterns. The regex patterns are split into multiple components at the boundary of these characters as illustrated in FIG. 17. The regex pattern aaba+defg spawns components aab, a, and defg since the pattern is split at the boundary of character a.

We now iteratively split the components that we obtain from the previous step so that no more than one component matches at the same position in the input text. The compiler guarantees that a component does not form a suffix of another component. In case of a violation, a component is split further into smaller components. For instance, in FIG. 17, a component fg is a suffix of another bigger component defg and the component defg is further split into de and fg. Now, the components de and fg cannot match at the same position in the text. Such violations are identified by the compiler and components are split recursively to obtain a disjoint set of components.

The run length encoder fuses consecutive occurrences of a pattern into a set consisting of the pattern itself and number of times it occurs consecutively in the input text. Hence, if consecutive occurrences of a smaller component in another larger component is found, the compiler fuses the repeated instance of a component into a single component. At the runtime, coalescer fuses the consecutive instances of a smaller component and the accelerator should be able to partially match the coalesced instance of a smaller component as a part of bigger component. For instance in FIG. 17, component a repeats twice in component aab and consequently, component aab is fused to ab.

2.1.2 Mapping Components to Bitsplit Automata

Once the components are available, the compiler compiles them to the bitsplit automata to be implemented in the pattern automata of accelerator hardware. However, the hardware consumes W characters per step and so compiler takes account of all the alignments of their occurrences with reference to the W-character window. The compiler prepends the components with a wildcard dot character to obtain W patterns each corresponding to a position in W-wide input text. The compiler also appends the components with the dot characters so that the size of the pattern is a multiple of W. FIG. 18 illustrates an example of the padding for a 4-wide accelerator. A component tr.ck is padded with dot character to obtain four different components, each accounting for an alignment of the text in a 4-wide window.

2.1.3 Compiling Character Classes

Character classes define a range of ASCII characters that can be matched at a particular position; the position can accommodate any character falling in a range of character class to generate a match. For instance, a regular expression tr[a-u]ck can match characters a to u at third position, including strings track, trick, and truck. Bitsplit machines, in their original form, cannot handle character classes even though the patterns are of fixed length. One way is to generate all the possible patterns by replacing the range specified by character classes by each character in the class. However, the approach can be expensive for character classes specifying wide range of characters and for the patterns containing multiple character classes. We augment the bitsplit automata to enable cheaper approach for detecting character classes. For each character class, the compiler generates a 256-bit vector, a bit in the vector corresponding to an ASCII character. A bit is set in the vector if a character falls in the range represented by the character class. For instance, for a character class [a-u] mentioned above, ASCII equivalent of character a is 97 and u is 117 and hence, bits 97 to 117 in a 256-bit vector are set. Likewise, the character classes in the regex patterns are identified by the compiler, compiled and stored in the character class memory unit. In an alternate embodiment, the character class unit compares the encoding of a character against a list of explicit range bounds (rather than a bit vector) stored in the character class memory unit. Character class unit produces a match when an input character falls in the range specified by a character class. Note here that multiple character classes can match for a particular input character.

The accelerator implements k additional bitsplit machines in the pattern automata to identify the k character classes in the context of the components. When a character classes is identified in the components, it is replaced with a dot character in the component as shown in FIG. 18. In addition, the compiler builds another set of character class components that match character classes to the input text in parallel. The newly created character class components retain the same length as their parent components, by replacing the non-character class characters with the dot character. These components are padded similar to the parent components as explained in Section 2.1.1. Once character class components are padded, they are compiled to generate a bitsplit state machines in the pattern automata.

In summary, the components containing character classes are split into two sets of components, those with and without character classes. These sets are separately padded and compiled to create bitsplit machines. Since character classes are recognized using a stage prior to bitsplit machines, they are identified with a bit set at a particular location in the padded component and hence directly mapped to the bitsplit machine.

2.1.4 Symbolic Matching of Regular Expressions

The compiler also generates a bitsplit automata for the second pass of the accelerator that combines the split components to match the regex patterns. The compiler assigns a unique symbolic ID to each component split by the first pass of the accelerator. The intermediate match unit, in the first pass, generates the matches in the form of these symbolic IDs. It generates a sequence of W symbolic IDs matching at each of the locations in a W character window of an input stream. The run length encoder merges the identical IDs occurring at consecutive locations to generate a fixed length sequence of IDs along with the number of times that particular ID recurs. For each regular expression pattern, compiler generates a sequence of symbolic IDs and the corresponding count that the second pass of accelerator should match. For instance, in FIG. 19, for a regular expression aaba+defg, compiler annotates each character with a symbolic ID of the component that it can match. Thus, the regular expression is annotated with a sequence.212.3.4 with a corresponding counts of .21.1.1. The dot character in count sequence for symbolic ID 2 indicates that the character a, can recur one or many times. The compiler generates a sequence of symbolic ID and corresponding sequence of count for each regular expression. These symbolic IDs and count sequences are then padded with dot characters similar to that for the components as discussed earlier and compiled to generate bitsplit automata as illustrated in FIG. 19.

2.1.5 Compilation of Other Regex Quantifiers

We have already discussed how the compiler compiles Kleene Plus quantifier and character classes. We now discuss other complex quantifiers that can occur in a regex pattern.

Alternation quantifier—If a regex pattern has an alternation quantifier, compiler matches each of the pattern separately. Thus, a regular expression c|python|perl spawns three separate patterns c, python, and perl and compile them to match them separately.

Optional quantifier—If a regex pattern has an optional quantifier, compiler generates two patterns—with and without an optional character. For regular expression (fe)?male, compiler matches two patterns female and male separately.

Concatenation quantifier—If a regex pattern has a concatenation quantifier, compiler compiles each of the sub-patterns as a component in the first stage followed by compiling all the possible combinations of symbolic IDs in the second stage. For a regular expression {a,b}{c} that can potentially match patterns ac and bc, characters a, b, and c are compiled as components in the first stage. The second stage then concatenates these components to search for patterns ac and bc.

Kleene Star—Kleene Star can match a character zero or more number of times. Similar to the optional quantifier, compiler creates two patterns, one without the repeating character, and the other with a character matching one or more times i.e. a character followed by a Kleene Plus. Thus, for a regular expression ab*c, compiler spawns patterns ac and ab+c.

Bounded repetition (min,max) quantifier—This quantifier defines a range of times a preceding character can repeat. The compiler accounts for this range in the count sequence while annotating regex patterns with their symbolic IDs. The range can be compiled in the second stage similar to the way the character classes are compiled in the first stage.

2.2 Hardware 2.2.1 Character Class Unit

The compiler identifies the character classes and compiles them to generate 256-bit vector depicting the range of ASCII characters that the classes represent. The 256-bit range vectors for each of the k character class are stored in the form of 256 rows in on-chip memory present in character class unit. Although we implement the range vectors in the form of the look-up table for ASCII characters, wider symbols such as UNICODE can be implemented in the form of range comparators. These k 256-bit vectors are stored in a column in a character class range memory, with each column compiling a different set of character class. The input characters, in their ASCII representation, perform a lookup to the character class range memory. The memory outputs a k-bit set of range matches representing whether the input character belongs to the k compiled character classes. The k-bit character class range match, along with 8-bit ASCII character, is then input to the bitsplit machines in the pattern automata.

2.2.2 Pattern Automata

The pattern automata implements $W_{max}$ lanes of 8+k bit-split machine. As explained later in section 2.2.4, these lanes are either shared between the input character stream and the run-length encoded symbols or used together to process $W_{max}$ characters per step depending on the type of patterns to be matched. The pattern automata unit consists of a bitsplit machine that consumes a single bit, transitions to the next state and outputs a set of PMV bits indicating all the possible component matches. The pattern automata consists of a dedicated on-chip memory for storing the state transitions and PMV bits for each bitsplit machine. The number of components |S| that a pattern automata can match is an architectural parameter and can be set at the design time. In cases when the storage is insufficient, or higher number of regex patterns have to be compiled, hardware can be reconfigured to match the components at a reduced throughput as explained later in Section 2.2.4.

FIG. 20 illustrates the pattern automata unit of accelerator that matches the components up to W characters per step of an input text. The state machine looks up the transition table stored in its on-chip memory to compute the next state and the corresponding PMV bits. Consider a bitsplit machine for bit 0, at state 0 at cycle N, consumes a bit value 0 of an input text and transitions to the state 6 in the next clock cycle. Each pattern automata contributes $|S| \times W$ bits of PMVs as output, all the lanes thereby generating $|S| \times W$ $W \times (8+k)$ bits of PMV.

2.2.3 Intermediate Match Unit

The intermediate match unit combines partial matches produced by the W lanes of pattern automata to produce a final match. The $W \times (8+k)$ vectors, each of width $|S| \times W$ bits, are bitwise AND'ed to yield intermediate match vector (IMV) of size $|S| \times W$ bits indicating intersection between the PMVs. A bit set in the IMV represents a component match. Note that only one component can match at a particular location in IMV since compiler ensures that no component can form a suffix of another component. In FIG. 20, first bit of IMV is set, indicating that the corresponding component has been matched by all the pattern automata. Since, only one component can match at a particular location in a W-wide window, a vector generated by intermediate match unit is one-hot encoded.

2.2.4 Reconfiguring Accelerator

The intermediate match unit outputs the matches for a fixed length components. When accelerator processes the patterns that are of fixed length, the output of intermediate match unit can be directly post-processed by field alignment unit and post-processing software to generate a final match. However, while solving regular expression patterns consisting of components that can repeat, multiple passes are performed to merge the component matches. In such cases, a feedback path consisting of a run length encoder is enabled to process such repeating components.

A set of lanes of pattern automata are specifically assigned to inspect the component matches that are processed along the feedback path. We reconfigure the accelerator to operate at the lower throughput by splitting the W lanes amongst the resources that process the input characters and those that process the components from the feedback path. The accelerator requires two passes of pattern automata and intermediate match unit to process the regular expression patterns. While inspecting a regular expression that requires two passes, accelerator processing throughput is halved and effective number of lanes W that can be allocated per pass is $W_{max}/2$. As shown in FIG. 16, $W_{max}/2$ lanes are assigned to process the character class match vectors while $W_{max}/2$ lanes are assigned to process the symbol and bound encoded count from the feedback path. The output of the later pass is then inspected for a desired regular expression pattern match.

One of the restrictions imposed by compiler while splitting a regular expression pattern is that no component can form a suffix of another component. Components consisting of simple ASCII characters can be further split to satisfy this requirement as explained in Section 2.1.1. However, components consisting of character class followed by a Kleene Plus or a Kleene Star cannot be split further since any character within a range defined by that character class can match at the particular positions. Moreover, architecture cannot match regular expressions such as (ab+c)+d that involve nested repetitions in an additional pass. We overcome this restriction by splitting the lanes further and cascading them along multiple passes that implement conflicting components on separate smaller lanes. The partial matches from the multiple lanes can then be combined to find the regular expression match.

2.2.5 Null Symbol Eliminator

Null symbol eliminator eliminates the symbols with no matches produced by the intermediate match unit. This simplifies the functionality of the run length encoder that coalesces repeating patterns in the input text. Repeating components that are more than one character wide generate a match consisting of multiple null symbols followed by a match on the last character. Instead of coalescing such matches across the null symbols, null symbol eliminator gets rid of them thereby allowing only a match on the last character of the component. In addition, it also implements an encoder unit to encode W one-hot matches of size $|S|$ bits into a set of W symbols of size $\log_2 |S|$. A set of W symbols is then output to the run length encoder for coalescing the repeating symbols.

2.2.6 Run Length Encoder

Run length encoder (RLE) unit converts the arbitrary sized regex patterns to a fixed length sequence of symbols so that they can be identified using bitsplit machines. The input to the RLE is a set of W symbolic IDs matched by the intermediate match unit. RLE identifies the IDs that recur at the consecutive positions and merges them into a single set consisting of the ID and count of the number of times it recurs. The IDs that get fused to the preceding positions result in the empty locations in the matched string. In order to process all the W IDs at once, the coalesced patterns are pipelined and merged with the IDs produced in the next clock cycle. In other words, the symbolic ID located at the first position of matches at clock N+1 is compared with the last valid ID of a coalesced pattern found at clock N. Once all the W positions are filled with the run-length encoded IDs, a set of symbolic IDs and the corresponding count is output to the bound encoder unit. Note that the majority of regex patterns consist of single character patterns recurring one or more times and so, the accelerator supports only such patterns currently. However, RLE can be extended to support longer recurring patterns with a nominally higher hardware complexity.

2.2.7 Bound Encoder

Some regular expression impose a bound on the number of times a component can recur in the input text. For instance, in a regular expression ab{5,10}c, component b can occur consecutively a minimum of 5 and maximum of 10 times. Bound encoder applies these constraints on the count values computed by RLE. It implements a set of programmable comparators that determine whether the count lie within a desired bound. In addition, components that are followed by a Kleene Plus in a regular expression can recur multiple times with a non-deterministic bound. A comparator in the bound encoder also checks for a count that is higher than 1. Since a lane of a pattern automata that compares the sequence of symbols and counts is 8+k wide, it can process 8+k bits at each position. As a symbol accounts for $\log_2 |S|$ bits, bound encoder can implement $8+k-\log_2 |S|$ distinct bound functions to compare the counts. Bound encoder outputs a sequence of W symbols and bound encoded counts to the pattern automata units.

FIG. 21 schematically illustrates an example of an apparatus 100 in which the techniques discussed above can be applied. The apparatus comprises a processor 102 for performing general purpose data processing operations in response to instructions stored in a memory 104. The processor 102 can have any known processor architecture, and may include at least one cache for caching data or instructions from memory 104 for faster access. The apparatus 100 also comprises a programmable hardware accelerator 106 dedicated to pattern matching. The hardware accelerator 106 may have accelerator architecture according to any of the embodiments discussed above. The hardware accelerator 106 may be powered down or placed in a power saving state when not in use. When the processor 102 requires a pattern matching task to be performed, then it executes a compiler program 108 stored in the memory 104. In response to inputs from the user defining the target patterns to be searched for in an input stream of symbols, the compiler generates configuration data 110 for controlling how the hardware accelerator 106 processes the input stream of symbols to search for patterns, and writes it to configuration registers in the accelerator 106. For example, the configuration data may include the character class definitions specifying which characters are members each class, the tables defining the bit matching state machines for each of the pattern automata, configuration data specifying the fields in which certain patterns are to be detected using the field alignment unit, and control data controlling how many passes of the architecture shown in FIG. 16 are required for processing a given input stream of symbols. Memory addresses of the input stream 112 of symbols to be processed may also be provided to the hardware accelerator. The processor may then issue a command to the hardware accelerator to start performing the pattern matching based on the configuration information 110. The hardware accelerator 106 reads the input stream 112 of symbols directly from the memory 104 without having to pass through the processor. The hardware accelerator 106 processes the input stream as discussed above, and returns information to the processor 102 identifying the positions in the input stream at which the required patterns have been detected.

FIG. 22 shows an example method of pattern matching. At step 120, the input stream of symbols is received by the hardware accelerator. At step 122, a first pass of the pattern matching circuitry is performed to identify a first set of predetermined patterns in the input stream. The first set of patterns may for example correspond to the components of one or more adjacent symbols which are to be detected for coalescing in the run length encoder. For example, the first set of patterns could correspond to the sub-divided components of the search terms identified by the compiler as in the example of FIG. 17.

At step 124, the identified patterns are mapped to symbol identifiers from an expanded symbol set. The expanded symbol set may include the original symbols as well as some additional symbols corresponding to components of two or more consecutive symbols as identified in the first pattern matching pass at step 122.

At step 126, the run length encoder unit performs run length encoding to generate an encoded stream of symbol identifiers, in which a number of consecutive repetitions of a same pattern of symbols detected in the input stream are mapped to a single instance of a symbol of the encoded stream, and corresponding repetition indicators indicative of the number of consecutive repetitions detected for each symbol in the encoded stream. The repetition indicators could be the count values mentioned above, or could be a Boolean flag indicating whether the symbol was repeated or not.

At step 128 a further pass of the pattern matching stage is performed to identify a further set of patterns in the encoded stream. The symbols themselves are passed to the bit split pattern automata to detect whether they match any of the patterns being tested, and also, if bounds are imposed on the number of repetitions permitted for a given symbol in a given pattern, then the repetition indicators for such symbols are compared with bounding conditions specified for the corresponding pattern, and if both the symbols themselves and the repetition indicators satisfy the requirements for the same pattern, then a match for that pattern is triggered. The pattern matching circuitry outputs an indication of which patterns matched.

At step 130, control circuitry determines whether a further pass is required, based on the configuration data 110 set by the compiler for the pattern matching task being performed. If a further pass is required, then the method returns to step 124 to map the patterns identified in the second pass to further symbols of yet another expanded symbol set (again including the symbols of the previous symbol set as well as additional symbols corresponding to combinations of multiple symbols from the previous pass), and further run length encoding and pattern matching is performed in steps 126 and 128. By using multiple passes through the pattern matching stage several with run length encoding between successive passes, this enables the hardware accelerator to search the input stream for regular expressions which involve nested combinations of Kleene plus, Kleene star or other bounded repetition operators.

If at step 130 it is determined that no further pass is required, then at step 132 the identified patterns are passed to subsequent stages for field alignment and post processing as in the examples discussed above.

Note that while the multiple passes of the pattern matching circuitry are shown sequentially in FIG. 22 for ease of understanding, in practice multiple passes may be performed in parallel on respective subsets of the pattern automata of the pattern matching circuitry, with each subset of pattern automata performing a different pass on portions of data corresponding to different portions of the original input stream. For example, in two-pass processing, while the lanes of pattern automata corresponding to the first pass are processing symbols from a current part of the input stream, other lanes of pattern automata may process part of the encoded stream which corresponds to an earlier part of the original input stream. Similarly, in a three-pass processing operation, the third pass may be processing data corresponding to a still earlier portion of the input stream than the one being processed by the second pass, and so on for each further pass.

FIG. 23 shows another example of a method of pattern matching, in which support for classes of symbols is provided. At step 150 an input stream of symbols is received. At step 152 the input stream of symbols is passed to a class detection unit to detect whether each symbol is a member of one or more classes of symbols. For example the classes could be defined using a lookup table as discussed above or by comparing the symbol identifiers with ranges of values defining the class. At step 154 the symbol identifier of each symbol is expanded to include at least one extra bit which indicates whether that symbol is a member of a corresponding class. The expanded symbol identifiers are then provided to the pattern matching stage at step 156 where a number of bit matching state machines are provided with each bit of the expanded symbol identifiers triggering state transitions of a corresponding state machine. At step 158, the pattern matching circuitry determines whether one or more query conditions are satisfied based on the states reached by each bit matching state machine. Hence, by expanding the symbol identifiers with class bits and providing additional bit matching state machines whose transitions are triggered by the class bits, in parallel with the existing state machines using the standard symbol identifier bits, the pattern detection technique discussed above can detect patterns defined such that certain symbol positions of the input stream may be considered to match against the pattern if the symbol is any member of a given class. In some examples, step 122 of FIG.

22 may include steps 152, 154, 156 and 158 of FIG. 23 so that the technique shown in FIG. 22 also supports searching for classes of characters.

While some specific embodiments have been discussed above, more generally an apparatus may be provided with pattern matching circuitry to detect instances of at least one predetermined pattern of symbols within a subject stream of symbols. By providing encoding circuitry for generating an encoded stream of symbols for independence on an input stream of symbols, which maps a number of consecutive repetitions of the same pattern of symbols detected in the input stream to a single instance of a symbol of the encoded stream and a corresponding repetition indicator indicative of the number of consecutive repetitions, control circuitry can control the pattern matching circuitry to process the encoded stream of symbols generated by the encoding circuitry as the subject stream, and this enables the pattern matching circuitry to support detection of patterns which may permit variable numbers of repetitions of symbols or groups of symbols, such as Kleene plus or bounded repetition operators in regular expressions.

In some examples the repetition indicator may not identify the absolute number of repetitions, but may simply be a value which distinguishes whether the number of consecutive repetitions is one, or greater than one. For example the repetition indicator could be a single-bit flag indicating whether an element of the encoded stream is repeated or not. Alternatively, more than one bit may be allocated for the repetition value. This type of repetition indicator is cheaper to implement in terms of hardware and may still provide enough information for supporting searching of regular expressions involving the Kleene plus operator, for example.

In other examples the repetition indicator may comprise a count value which indicates the absolute number of consecutive repetitions of the corresponding symbol detected. This type of repetition indicator provides further information which can be useful if patterns involving specified bounds on the number of repetitions of a given component of symbols are to be detected.

When the pattern matching circuitry processes the encoded stream as the subject stream, then in addition to identifying certain patterns of symbols in the encoded stream, there may also be a check for whether the corresponding repetition indicator for at least one symbol satisfies at least one bounding condition. For example, for some symbols in the pattern, repetition may not be allowed and so the bounding condition may require that the repetition indicator indicates only one repetition of that symbol. For other symbols, the bounding condition could require that the repetition indicator indicates a number of repetitions within a certain numeric range.

In some embodiments, the run time encoding may only support coalescing of repeated instances of a single symbol (e.g. aaaabb may be coalesced to a4b2), but may not support repetitions of groups of symbols such as coalescing abab to (ab)2). This can simplify the hardware design since there would not be any need for pattern matching before the encoder, and instead the input stream could be supplied direct to the encoder.

However, to support more complex searching of regular expressions involving repetitions of a component comprising more than one symbols (e.g. ab(cd)+f), it can be useful to provide further pattern matching capability prior to performing the encoding, to search for the patterns of one or more symbols of the input stream whose repeated instances are to be coalesced into a single instance and repetition indicator by the encoding circuitry. In this case, the symbol set used for the encoded stream may include both symbols corresponding to original symbols of the input stream, and symbols corresponding to a group of multiple symbols of the input stream. One approach may be to have two separate pattern matching stages, one before the encoding circuitry for identifying the component patterns to be encoded by the encoder, and another after the encoding circuitry for then processing the encoded stream to identify the patterns.

However, as identifying the patterns of symbols which are to be coalesced in the run length encoding may involve similar processing steps to the steps performed for subsequently identifying the target patterns in the encoded stream, it can be efficient in terms of hardware to use a common pattern matching stage for both stages of pattern matching.

Hence, in a first pass of the pattern matching circuitry, the input stream of symbols may be processed as the subject stream based on a first set of at least one predetermined pattern to be detected. The first set of pattern data may correspond to the components of one or more symbols to be mapped by the encoding circuitry. The first pass may return a series of identifiers of symbols from the expanded symbol set, which may then be coalesced into the encoded stream of symbols by the encoding circuitry, with consecutive repetitions of the same pattern in the input stream mapped to a single instance of a symbol in the encoded stream. The control circuitry may then control the pattern matching circuitry to process the encoded stream in a second pass of the pattern matching circuitry, based on a second set of at least one predetermined pattern. This time the second set of patterns may correspond to the actual patterns to be detected.

The first and second passes may operate in parallel with the first pass processing a current portion of the input stream using a first subset of pattern matching units while meanwhile the second pass processes a portion of encoded stream corresponding to an earlier part of the input stream than the current portion using a second subset of the pattern matching units. Which pattern matching units are allocated to the first pass or the second pass may depend on the number of symbols being processed in parallel, the number of bits in each symbol, the number of different patterns to be identified, etc. This architecture provides flexibility for processing different kinds of pattern querying tasks with efficient hardware.

For some types of patterns, three or more passes may be required, and so after identifying the second set of patterns in the encoded stream there may be a further encoding step to generate a further stream of symbols with repetitions of the same pattern detected in the second pass being mapped as a single symbol and a corresponding repetition indicator in the further stream, and then the pattern matching circuitry may perform a third pass of pattern matching based on the further stream and identify a third set of patterns. By providing support for more than two passes in this way, this allows searching for patterns corresponding to nested repetition operators where, for example, one Kleene plus operator includes a repetition of another element itself including a Kleene plus operator. Again the third pass may happen in parallel with the first and second passes with respective lanes of pattern detecting units processing data corresponding to different portions of the original input stream.

In some embodiments the pattern matching circuitry could process a single symbol of the input stream per clock cycle. However, the bandwidth can be increased by providing the pattern matching circuitry which processes a group of at least two adjacent symbols of the subject stream in parallel to detect whether the group of adjacent symbols satisfies any of a plurality of query conditions including query conditions corresponding to different alignments of the same predetermined pattern with respect to the group of adjacent symbols. In such an embodiment, the use of the run length encoding circuitry is particularly useful because the number of query conditions would explode further if, for every possible query corresponding to different alignments of a given pattern with respect to the window of symbols being processed in parallel, there would also need to be multiple different versions of each of those queries corresponding to every possible number of repetitions of the same component permitted by the regular expression being searched for. By providing encoding circuitry for run length encoding, patterns including variable numbers of repetitions of a given set of one or more symbols can be mapped to a canonical form which enables searching of such patterns using the same query condition. This greatly reduces the complexity of the pattern matching.

The pattern matching circuitry may comprise multiple pattern automaton units for operating in parallel on respective bit portions of the group of one or more adjacent symbols. Each pattern automaton unit may output a partial match value indicating based on the corresponding bit portion, indicating which of one or more query conditions representing at least one pattern to be identified are potentially satisfied by the group of adjacent symbols. Combining circuitry may then combine the partial match values generated by each of the pattern automaton units operating on the same group of adjacent symbols to generate a match value indicating any query condition for which the same query condition is determined as potentially satisfied by all of the pattern automaton unit. In some examples, each bit portion may comprise a single bit (i.e. the pattern automata are bit-split as in the embodiments discussed above). However, it is also possible to use bit portions comprising two or more bits, in which each pattern automaton unit acts on a larger portion of a symbol.

In some examples, each pattern automaton unit may have storage circuitry for storing programmable data indicating a state machine comprising a number of states with each state associated with a partial match value indicating which of the query conditions are potentially satisfied following a sequence of state transitions leading to that state. In each cycle, the relevant bit portion of a symbol in the window of symbols being processed is supplied to the corresponding pattern automaton unit, which transitions the state machine from a current state to a subsequent state selected based on the supplied bit portion, and the partial match value associated with the selected subsequent state is then output to indicate the possible query conditions which could potentially have matched based only on the knowledge of that bit portion. The partial match values are combined to identify a particular query as being satisfied if all the state machines identified that query as matching based on their individual bit portions. By splitting the symbols into bit portions, the state machine associated with each bit portion is much simpler because there are fewer possible transitions to the subsequent state possible in each cycle, making storage of the table defining the state machine more tractable.

In some cases multiple query conditions can be applied simultaneously, in which case the partial match value from a given pattern automaton unit may be a partial match vector with multiple fields indicating whether each of a plurality of query conditions are potentially matched by the window of symbols including the particular bit portion being processed by that pattern automaton unit. Similarly, the match value may be a match vector indicating whether each of the plurality of query conditions is satisfied by the window of symbols as a whole. Also, the vectors may include multiple sets of indicators for each query condition, to indicate for each different symbol position within the group of symbols being processed whether that query condition is satisfied by a run of symbols ending at that symbol position.

The pattern matching circuitry described above can be useful for a range of applications, for example text processing to search for certain strings in a stream of text, where the symbols of the input stream may be ASCII and/or UNICODE characters, or deep packet inspection to check network packets for certain bit patterns, where the symbols may comprise portions of data (e.g. bytes, sub-groups of bits, or fields) extracted from network packets.

In some cases, a programmable hardware accelerator may comprise the pattern matching circuitry, encoding circuitry and control circuitry, and the apparatus may also include general purpose processing circuitry to perform general data processing in response to instructions. By providing a specific hardware accelerator dedicated to pattern matching, this can enable pattern matching tasks to be processed more efficiently than using software executed on a general purpose processor. The pattern matching circuitry may process the subject stream of symbols based on query data defining query conditions which are programmable by compiler software executed by the processing circuitry.

There are a number of ways of implementing the hardware accelerator. In some examples, the accelerator can be a discrete hardware component. Also, the hardware accelerator may be an application specific integrated circuit (ASIC). Also, the hardware accelerator may be implemented as a configuration of a field-programmable gate array (FPGA).

In another example, pattern matching circuitry for pattern matching using a number of bit matching state machines may be provided with symbol classifying circuitry to expand symbol identifiers of an input stream of symbols into expanded symbol identifiers which include at least one additional bit indicating whether a corresponding symbol is a member of a corresponding class of symbols. Each bit matching state machine may then transition between states in dependence on a corresponding bit of the expanded symbol identifiers, and the pattern matching circuitry may identify whether a given query condition is satisfied based on the states reached by each of the bit matching state machines. This enables patterns to be searched in hardware, where some of the patterns may be considered to match if a symbol at a given symbol position is any one of a range of different symbols as defined in the corresponding class.

In one example the symbol classifying circuitry may comprise a class look up table which stores, for each symbol type, a class vector indicating the classes which that symbol belongs to. The class lookup table may be looked up based on a given symbol identifier and then this may return a class vector providing the additional bits to be appended to the symbol identifier to form the expanded symbol identifier.

Alternatively, the symbol classifying circuitry may determine whether a symbol is a member of a given class based on whether its symbol identifier is within a certain numeric range specified for each class. This may be more efficient to implement in hardware, especially for character sets such as UNICODE which include a larger number of characters for which a full lookup table may be too expensive.

REFERENCES

[1] Apache Hadoop. http://hadoop.apache.org.
[2] Intel W5590 Processor Specifications. http://ark.intel.com/products/41643.
[3] Splunk. http://www.splunk.com.
[4] A. V. Aho and M. J. Corasick. Efficient String Matching: An Aid to Bibliographic Search. Commun. ACM, 18(6), June 1975.
[5] S. Borkar and A. A. Chien. The Future of Microprocessors. Communications of the ACM, 54(5):67-77, May 2011.
[6] A. Bremler-Barr, D. Hay, and Y. Koral. CompactDFA: Generic State Machine Compression for Scalable Pattern Matching. In Proc. INFOCOM, 2010.
[7] D. Bryant. Disrupting the Data Center to Create the Digital Services Economy. Intel Corporation, 2014.
[8] M. Busch, K. Gade, B. Larson, P Lok, S. Luckenbill, and J. Lin. Earlybird: Real-Time Search at Twitter. In Proc. International Conference on Data Engineering, 2012.
[9] C. C. Chen and S. D. Wang. An Efficient Multicharacter Transition String-matching Engine Based on the Aho-corasick Algorithm. ACM Transactions on Architecture and Code Optimization, 2013.
[10] N. Doshi. Using File Contents as Input for Search. Splunk Blogs, 2009.
[11] H. Esmaeilzadeh, E. Blem. R. St. Amant, K. Sankaralingam, and D. Burger. Dark Silicon and the End of Multicore Scaling. In Intl. Symposium on Computer Architecture, 2011.
[12] N. Hua, H. Song, and T. Lakshman. Variable-Stride Multi-Pattern Matching For Scalable Deep Packet Inspection. In INFOCOM 2009, IEEE, 2009.
[13] IBM Corporation. IBM PureData System for Analytics Architecture: A Platform for High Performance Data Warehousing and Analytics. IBM Corporation, 2010.
[14] O. Kocberber, B. Grot, J. Picorel, B. Falsafi, K. Lim, and P. Ranganathan. Meet the Walkers: Accelerating Index Traversals for In-memory Databases. In Proc. 46th Annual International Symp. on Microarchitecture, 2013.
[15] A. Lamb, M. Fuller, R. Varadarajan, N. Tran, B. Vandiver, L. Doshi, and C. Bear. The Vertica Analytic Database: C-store 7 Years Later. Proc. VLDB Endow., 2012.
[16] J. Lunteren, C. Hagleitner, T. Heil, G. Biran, U. Shvadron, and K. Atasu. Designing a Programmable Wire-Speed Regular-Expression Matching Accelerator. In International Symp. on Microarchitecture, 2012.
[17] S. Manegold, M. L. Kersten, and P Boncz. Database Architecture Evolution: Mammals Flourished Long Before Dinosaurs Became Extinct. Proceedings of the VLDB Endowment, 2009.
[18] M. McCandless, E. Hatcher, and O. Gospodnetic. Lucene in Action. Manning Publications, 2010.
[19] S. Melnik, A. Gubarev, J. J. Long, G. Romer, S. Shivakumar, M. Tolton, and T. Vassilakis. Dremel: Interactive Analysis of Web-Scale Datasets. In PVLDB, 2010.
[20] R. Muller, J. Teubner, and G. Alonso. Data processing on fpgas. PVLDB, 2(1):910-921, 2009.
[21] L. Neumeyer, B. Robbins, A. Nair, and A. Kesari. S4: Distributed Stream Computing Platform. In International Conf. on Data Mining Workshops, 2010.
[22] D. Pao, W. Lin, and B. Liu. A Memory-efficient Pipelined Implementation of the Aho-corasick String-matching Algorithm. ACM Transactions on Architecture and Code Optimization, 2010.
[23] A. Pavlo, E. Paulson, A. Rasin, D. J. Abadi, D. J. DeWitt, S. Madden, and M. Stonebraker. A Comparison of Approaches to Large-scale Data Analysis. In Proc. of the 2009 ACM SIGMOD International Conference on Management of Data, 2009.
[24] A. Raghavan, Y. Luo, A. Chandawalla, M. Papaefthymiou, K. P. Pipe, T. Wenisch, and M. Martin. Computational Sprinting. In 18th International Symposium on High Performance Computer Architecture, 2012.
[25] M. E. Richard L. Villars, Carl W. Olofson. Big Data: What It Is and Why You Should Care. IDC, 2011.
[26] V. Sikka, F Farber, A. K. Goel, and W. Lehner. SAP HANA: the evolution from a modern main-memory data platform to an enterprise application platform. PVLDB, 6(11):1184-1185, 2013.
[27] M. Stonebraker, U. C, etintemel, and S. Zdonik. The 8 Requirements of Real-time Stream Processing. ACM SIGMOD Record, 2005.
[28] M. Stonebraker and A. Weisberg. The VoltDB Main Memory DBMS. In Bulletin of the IEEE Computer Society Technical Committee on Data Engineering, 2013.
[29] Synopsys. DesignWare Building Blocks. 2011.
[30] L. Tan and T. Sherwood. A High Throughput String Matching Architecture for Intrusion Detection and Prevention. In Computer Architecture, 2005. ISCA '05. Proceedings. 32nd International Symposium on, 2005.
[31] M. Taylor. Is Dark Silicon Useful? Harnessing the Four Horsemen of the Coming Dark Silicon Apocalypse. In Design Automation Conference, pages 1131-1136, 2012.
[32] J. Teubner, L. Woods, and C. Nie. Skeleton automata for fpgas: reconfiguring without reconstructing. In Proceedings of the ACM SIGMOD International Conference on Management of Data, pages 229-240, 2012.
[33] L. Woods, J. Teubner, and G. Alonso. Complex event detection at wire speed with fpgas. PVLDB, 3(1):660-669, 2010.
[34] L. Wu, A. Lottarini, T. K. Paine, M. A. Kim, and K. A. Ross. Q100: The Architecture and Design of a Database Processing Unit. In Proceedings of the 19th International Conference on Architectural Support for Programming Languages and Operating Systems, ASPLOS '14, 2014.
[35] M. Zaharia, M. Chowdhury, T. Das, A. Dave, J. Ma, M. McCauly, M. J. Franklin, S. Shenker, and I. Stoica. Resilient Distributed Datasets: A Fault-Tolerant Abstraction for In-Memory Cluster Computing. In 9th USENIX Symposium on Networked Systems Design and Implementation (NSDI 12), 2012.
[36] X. Zha and S. Sahni. GPU-to-GPU and Host-to-Host Multipattern String Matching on a GPU. Computers, IEEE Transactions on, 2013.

The following clauses set out other example arrangements:
1. A method of processing data comprising the steps of:
   receiving a query specifying a query operation to be performed upon a set of input data;
   generating a plurality of partial query programs each corresponding to a portion of said query operation; and
   executing each of said plurality of partial query programs with all of said set of said input data as an input to each of said plurality of partial query programs.
2. A method as claimed in clause 1, wherein said step of executing executes each of said plurality of partial programs with one of a plurality of programmable hardware execution units.
3. A method as claimed in clause 1, wherein said input data is an unindexed sequence of character data.
4. A method as claimed in clause 1, comprising the step of aggregating a plurality of partial results resulting from respective ones of said partial query programs to form an aggregated result corresponding to a result of said query.

5. A method as claimed in clause 4, wherein said step of aggregating is performed as a single process upon said plurality of partial results.

6. A method of processing data comprising the steps of:
receiving a query specifying a query operation to be performed upon input data,
programming one or more hardware execution units to perform said query, wherein
said step of programming programs said one or more hardware execution units to use selected ones of a plurality of different query algorithms to perform different portions of said query operation upon different portions of said input data.

7. A method as claimed in clause 6, wherein said plurality of different algorithms comprise one or more of:
a per-character pattern matching algorithm using a character matching state machine representing a query operation to be performed with each sequence of one or more characters within a sequence of characters to be queried determining a transition between two states of said character matching state machine and each state within said character matching state machine corresponding a given sequence of received characters; and
a per-bit pattern matching algorithm using a plurality of bit matching state machines representing a query operation to be performed with each bit of each character within said sequence of characters to be queried determining a transition between two states of one said plurality of bit matching state machines and each state within said bit matching state machine corresponding a bit within one or more sequences of received characters; and
a content addressable memory based algorithm using a content addressable memory storing a plurality of target character sequences to be compared in parallel with one or more characters of a received sequence of characters.

8. A method as claimed in clause 6, wherein said one of more hardware execution units each comprise hardware circuits for performing any one of said plurality of different query algorithms.

9. A method as claimed in clause 6, wherein said step of programming selects which one of said plurality of different query algorithms to use on a per-character basis within a sequence of characters to be queried.

10. A method as claimed in clause 6, wherein said step of programming selects which of said plurality of different query algorithms to use so as to target one or more of:
a programming storage requirement limit of said one or more hardware execution units;
a processing time limit; and
a hardware resources limit of said one or more hardware execution units.

11. Apparatus for processing data comprising:
a memory to store a sequence of data to be queried;
delimiter identifying circuitry to identify data delimiters between portions of said sequence of data as said data is stored to said memory; and
a delimiter store to store storage locations of said data delimiters within said memory.

12. Apparatus as claimed in clause 11, comprising a plurality of hardware execution units to query said sequence of data stored within said memory, wherein said plurality of hardware execution units are free to query respective different portions of said sequence of data at a given time.

13. Apparatus as claimed in clause 12, wherein when a given one of said plurality of hardware execution units determines it has completed querying a portion of said sequence of data, a read of said delimiter store identifies a start of a next portion of said sequence of data to be queried by said given one of said plurality of hardware execution units.

14. Apparatus as claimed in clause 12, wherein said sequence of data stored within said memory is a part of a larger sequence of data and comprising management circuitry to manage which part of said larger sequence of data is stored within said memory at a given time, said management circuitry maintaining a pointer into said memory for each of said plurality of hardware execution units and including a head pointer to indicate a latest point within said larger sequence stored in said memory and a tail pointer to indicate an earliest point within said larger sequence already loaded to said memory for which processing by said plurality of hardware execution units is not yet completed, said management circuitry using said head pointer and said tail pointer to control loading data to said memory and removing data from said memory.

15. Apparatus as claimed in clause 11, wherein said data delimiters identify variable boundary locations between portions of said sequence of data to be separately queried.

16. Apparatus for processing data comprising:
programmable processing hardware responsive to a number match program instruction to identify a numeric variable and to determine a value of said numeric variable located at a variable position within a sequence of characters.

17. Apparatus as claimed in clause 16, wherein said numeric variable is one of:
an integer value;
a floating point value; and
a date value.

18. Apparatus as claimed in clause 16, wherein said programmable processing hardware is programmable to perform a query operation upon an unindexed sequence of character data.

19. Apparatus as claimed in clause 16, wherein an output of said number match program instruction comprises said number value stored within a register specified by said number match program instruction.

20. Apparatus as claimed in clause 16, comprising a plurality of instances of said programmable processing hardware to perform respective portions of a query upon said sequence of characters.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
pattern matching circuitry to detect instances of at least one predetermined pattern of symbols within a subject stream of symbols, wherein the pattern matching circuitry comprises:
a plurality of pattern automaton units configured to operate in parallel on corresponding bit portions of a group of one or more adjacent symbols, each pattern automaton unit configured to output a partial match value indicating, based on the corresponding bit portion, which of one or more query conditions representing said at least one predetermined pattern are potentially satisfied by the group of adjacent symbols; and combining circuitry to combine the partial match values generated by a set of pattern automaton units operating on the same group of adjacent symbols to generate a match value indicating any query condition for which the same query condition is determined as potentially satisfied by all of said set of pattern automaton units;

encoding circuitry to generate an encoded stream of symbols in dependence on an input stream of symbols, wherein the encoding circuitry is configured to map a number of consecutive repetitions of a same pattern of one or more symbols detected within the input stream to a single instance of a symbol of the encoded stream and a corresponding repetition indicator indicative of said number of consecutive repetitions of said same pattern detected in said input stream of symbols; and control circuitry to control the pattern matching circuitry to process the encoded stream of symbols generated by the encoding circuitry as the subject stream.

2. The apparatus according to claim 1, wherein the repetition indicator comprises a value indicative of whether the number of consecutive repetitions is 1 or greater than 1.

3. The apparatus according to claim 1, wherein the repetition indicator comprises a count value indicative of said number of consecutive repetitions.

4. The apparatus according to claim 1, wherein when processing the encoded stream as the subject stream, the pattern matching circuitry is configured to determine whether the input stream includes one of said at least one predetermined pattern in dependence on whether the repetition indicator corresponding to at least one symbol of the encoded stream satisfies at least one bounding condition.

5. The apparatus according to claim 1, wherein the control circuitry is configured to control the pattern matching circuitry to process the input stream of symbols as the subject stream of symbols in a first pass of the pattern matching circuitry based on a first set of at least one predetermined pattern; and the control circuitry is configured to control the pattern matching circuitry to process the encoded stream of components as the subject stream of symbols in a second pass of the pattern matching circuitry based on a second set of at least one predetermined pattern.

6. The apparatus according to claim 5, wherein the pattern matching circuitry comprises a plurality of pattern matching units;

in the first pass of the pattern matching circuitry, the control circuitry is configured to control a first subset of the pattern matching units to process a current portion of the input stream; and in the second pass of the pattern matching circuitry, the control circuitry is configured to control a second subset of the pattern matching units to process a portion of the encoded stream corresponding to an earlier portion of the input stream than said current portion, in parallel with processing of said current portion of the input stream by said first subset of the pattern matching units.

7. The apparatus according to claim 5, wherein the control circuitry has a configuration to control the encoding circuitry to perform further encoding to generate a further stream of symbols in which a number of consecutive repetitions of a pattern of one or more symbols detected in the encoded stream by the pattern matching circuitry in the second pass are mapped to a single symbol representing the pattern and a corresponding repetition indicator indicative of said number of consecutive repetitions, and to control the pattern matching circuitry to process the further stream as the subject stream of symbols in a third pass of the pattern matching circuitry based on a third set of at least one predetermined pattern.

8. The apparatus according to claim 1, wherein the pattern matching circuitry is configured to process a group of at least two adjacent symbols of the subject stream in parallel to detect whether the group of adjacent symbols satisfies any of a plurality of query conditions including query conditions corresponding to different alignments of the same predetermined pattern with respect to the group of adjacent symbols.

9. The apparatus according to claim 1, wherein the partial match value comprises a partial match vector indicating which of a plurality of query conditions are potentially satisfied by the group of adjacent symbols, and the match value comprises a match vector indicating which of the plurality of query conditions were determined as potentially satisfied by all of said set of pattern automaton units.

10. The apparatus according to claim 1, wherein each pattern automaton unit comprises storage circuitry to store programmable data indicative of a state machine comprising a plurality of states, each state associated with a partial match value indicating which of the one or more query conditions are potentially satisfied following a sequence of state transitions leading to that state; and in response to the corresponding bit portion, each pattern automaton unit is configured to transition from a current state of the state machine to a subsequent state of the state machine selected based on said corresponding bit portion, and to output the partial match value associated with said subsequent state.

11. The apparatus according to claim 1, wherein the symbols of the input stream comprise at least one of ASCII and UNICODE characters.

12. The apparatus according to claim 1, wherein the symbols of the input stream comprise portions of data extracted from a network packet.

13. The apparatus according to claim 1, comprising processing circuitry configured to perform data processing in response to instructions; and programmable hardware accelerator circuitry comprising the pattern matching circuitry, the encoding circuitry and the control circuitry.

14. The apparatus according to claim 13, wherein the pattern matching circuitry is configured to process the subject stream of symbols based on query data defining query conditions programmable by compiler software executed by the processing circuitry.

15. A computer-implemented pattern matching method, comprising:

receiving an input stream of symbols;

generating an encoded stream of symbols in dependence on the input stream of symbols, wherein a number of consecutive repetitions of a same pattern of one or more symbols detected within the input stream are mapped to a single instance of a symbol of the encoded stream and a corresponding repetition indicator indicative of said number of consecutive repetitions of said same pattern detected in said input stream of symbols; and detecting instances of at least one predetermined pattern of symbols within the encoded stream of symbols, using pattern matching circuitry comprising:

a plurality of pattern automaton units configured to operate in parallel on corresponding bit portions of a group of one or more adjacent symbols, each pattern automaton unit configured to output a partial match value indicating, based on the corresponding bit portion, which of one or more query conditions representing said at least one predetermined pattern are potentially satisfied by the group of adjacent symbols; and combining circuitry to combine the partial match values generated by a set of pattern automaton units operating on the same group of adjacent symbols to generate a match value indicating any query condition for which the same query condition is determined as potentially satisfied by all of said set of pattern automaton units.

* * * * *